US012645679B2

(12) United States Patent
Karl et al.

(10) Patent No.: US 12,645,679 B2
(45) Date of Patent: *Jun. 2, 2026

(54) VIRTUAL DATABASE TABLES WITH UPDATABLE LOGICAL TABLE POINTERS

(71) Applicant: SAP SE, Walldorf (DE)

(72) Inventors: Ruediger Karl, Walbstadt (DE); Mihnea Andrei, Issy les Moulineaux (FR); Juchang Lee, Seoul (KR); Stefan Baeuerle, Rauenberg-Rotenberg (DE); Seyeong Bae, Seoul (KR); Joo Yeon Lee, Seoul (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,114

(22) Filed: Jan. 29, 2024

(65) Prior Publication Data

US 2024/0168954 A1 May 23, 2024

Related U.S. Application Data

(63) Continuation of application No. 17/830,935, filed on Jun. 2, 2022, now Pat. No. 11,934,407, which is a
(Continued)

(51) Int. Cl.
*G06F 7/00* (2006.01)
*G06F 16/23* (2019.01)
(Continued)

(52) U.S. Cl.
CPC .... *G06F 16/24562* (2019.01); *G06F 16/2379* (2019.01); *G06F 16/24552* (2019.01)

(58) Field of Classification Search
USPC ................. 707/688–704, 670–704, 660–704
See application file for complete search history.

(56) References Cited

U.S. PATENT DOCUMENTS 6,549,901 B1    4/2003  Loaiza
6,694,306 B1    2/2004  Nishizawa
(Continued)

OTHER PUBLICATIONS

Non-Final Office Action received in U.S. Appl. No. 18/137,693, filed Feb. 22, 2024, 23 pages.
(Continued)

*Primary Examiner* — Tuan A Pham
(74) *Attorney, Agent, or Firm* — Klarquist Sparkman, LLP

(57) ABSTRACT

Techniques and solutions are described for implementing virtual table schemas. A virtual table schema includes a logical pointer that is used to target a table that includes data and is defined according to the virtual table schema. Values assigned to the logical pointer can be used to target tables at different locations, such as in-memory storage or in dynamic storage of a database management system. The dynamic storage includes an in-memory buffer cache and persistent storage. The logical pointer can be updated to point to the in-memory storage or the dynamic storage, including based on use statistics. Similarly, a table having data for the virtual table can be transitioned between the in-memory buffer cache and the persistent storage, including based on use statistics for the virtual table. A value for the logical pointer can be updated when the table is transferred between the in-memory buffer cache and the dynamic storage.

20 Claims, 17 Drawing Sheets

Related U.S. Application Data continuation of application No. 16/713,929, filed on Dec. 13, 2019, now Pat. No. 11,379,486.

(60) Provisional application No. 62/903,459, filed on Sep. 20, 2019.

(51) Int. Cl.
 *G06F 16/2455* (2019.01)
 *G06F 17/00* (2019.01)

(56) References Cited

U.S. PATENT DOCUMENTS

| | | | | |
|---|---|---|---|---|
| 7,395,258 | B2 | 7/2008 | Altinel et al. | |
| 8,874,620 | B1 * | 10/2014 | Rohr | G06F 16/252 |
| | | | | 707/809 |
| 9,824,128 | B1 * | 11/2017 | Maluf | G06F 16/248 |
| 10,489,356 | B1 | 11/2019 | Shah | |
| 10,649,964 | B2 | 5/2020 | Nguyen et al. | |
| 10,768,905 | B2 | 9/2020 | Leen et al. | |
| 10,896,176 | B1 * | 1/2021 | Creedon | G06F 16/2455 |
| 2006/0026154 | A1 | 2/2006 | Altinel et al. | |
| 2006/0294058 | A1 * | 12/2006 | Zabback | G06F 16/2462 |
| 2008/0306904 | A1 | 12/2008 | Fukuda et al. | |
| 2011/0289055 | A1 | 11/2011 | Pothering et al. | |
| 2016/0055220 | A1 * | 2/2016 | Joshi | G06F 16/319 |
| | | | | 707/722 |
| 2016/0224594 | A1 | 8/2016 | Chow et al. | |
| 2016/0328461 | A1 * | 11/2016 | Ahmed | G06F 16/27 |
| 2018/0121129 | A1 | 5/2018 | Sawhney | |
| 2018/0150520 | A1 | 5/2018 | Koetter et al. | |
| 2018/0225052 | A1 * | 8/2018 | Rogers | G06F 11/2064 |
| 2019/0220534 | A1 | 7/2019 | Singh et al. | |
| 2019/0294722 | A1 | 9/2019 | Mohan | |
| 2020/0150734 | A1 | 5/2020 | Ma et al. | |
| 2021/0089540 | A1 | 3/2021 | Karl et al. | |
| 2021/0089550 | A1 | 3/2021 | Karl et al. | |
| 2021/0089552 | A1 | 3/2021 | Karl et al. | |
| 2022/0197922 | A1 | 6/2022 | Karl et al. | |
| 2022/0292099 | A1 | 9/2022 | Karl et al. | |
| 2023/0259522 | A1 | 8/2023 | Karl et al. | |

OTHER PUBLICATIONS

European Search Report received in related European Application No. 20194962.5, dated Nov. 10, 2020, 12 pages.

Giduthuri, SAP HANA Native Storage Extension: A Cost-Effective & Simplified Architecture for Enhanced Scalability, SAP Blogs, SAP Community Business Trends, Apr. 17, 2019 pp. 1-8.

Sherkat et al., "Native Store Extension for SAP HANA," Proceedings of VLDB Endowment, vol. 12, No. 12, Aug. 2019, pp. 2047-2058.

Zikmund, Nove moznosti optimalizace ukladani dat V SAP HANA (Dynamic tiering) http://www.sapevents.edgesuite.net/, Sep. 2015 (Sep. 2015), pp. 1-35.

European Search Report received in related European Application No. 20195241.3, dated Nov. 13, 2020, 12 pages.

Webadmin, Use Case to S/4HANA Smart Data Integration (SDI), SAPSPOT.com, Aug. 1, 2018, pp. 1-15.

Anonymous: SAP HANA Administration Guide for SAP HANA Platform, in SAP HANA Administration Guide for SAP Platform, Oct. 31, 2019, 104 pages.

European Search Report received in related European Application No. 20195250.4, Nov. 16, 2020, 11 pages.

Create Virtual Table Statement (Data Definition) retrieved from: https://help.sap.com/viewer/4fe29514fd584807ac9f2a04f6754767/2.0.02/en-us/d2a0406155f24a49aa6c549e0c428bd7.html, at least as early as Dec. 2019, 2 pages.

Define Change Processes—SAP Documentation, retrieved from: https://help.sap.com/doc/saphelp_crm700_ehp03/7.0.3.11/en-us/91/49a351c76fb712e10000000a423f68/content.htm?no_cache=true, at least as early as Dec. 2019, 4 pages.

SAP HANA SPS 11—What's New, Smart Data Access, SAP HANA Product Management, retrieved from: https://www.slideshare.net/SAPTechnology/whats-new-on-sap-hana-smart-data-access, Dec. 2015, 24 pages.

Ruter et al., "Smart Data Access: Data Virtualization in SAP HANA," Rheinwerk Publishing, retrieved from: https://www.sap-press.com/smart-data-access-data-virtualization-in-sap-hana_4091/, at least as early Dec. 2019, 93 pages.

Demystifying Smart Data Access in Sap Hana, retrieved from: https://www.zarantech.com/blog/demystifying-smart-data-access-sap-hana/, May 8, 2017, 12 pages.

Kapase, HANA SDI is super set of all, if and only if—HANA is the main data target, retrieved from: https://blogs.sap.com/2018/06/15/hana-sdi-is-super-set-of-all-if-and-only-if-hana-is-the-main-data-target./, Jun. 15, 2018, 10 pages.

Bahl, Use Case to S/4HANA Smart Data Integration (SDI), retrieved from: https://blogs.sap.com/2018/07/29/use-case-to-s4hana-smart-data-integration-sdi/, Jul. 29, 2018, 15 pages.

Daehn, "HANA Smart Data Integration—The one stop solution for data handling," retrieved: https://blogs.sap.com/2016/01/11/hana-smart-data-integration-one-stop-solution-data-handling/, Jan. 11, 2016, 15 pages.

SAP HANA Native Storage Extension, retrieved from: https://help.sap.com/viewer/6b94445c94ae495c83a19646e7c3fd56/2.0.04/en-us/4efaa94f8057425c8c7021da6fc2ddf5.html, Oct. 31, 2019, 2 pages.

Waywell, "SAP HANA Native Storage Extension: A Native Warm Data Tiering Solution," retrieved from: https://blogs.sap.com/2019/04/16/sap-hana-native-storage-extension-a-native-warm-data-tiering-solution/, Aug. 16, 2019, 16 pages.

Federated Database System, Wikipedia, at least as early as Dec. 2019, 6 pages.

Data Lake, Wikipedia, at least as early as Dec. 2019, 4 pages.

Binary Large Object, Wikipedia, at least as early as Dec. 2019, 2 pages.

SAP Data Warehouse Cloud: Bridging an Important Gap in the SAP Analytics, retrieved from: https://itelligencegroup.com/uk/local-blog/sap-data-warehouse-cloud-bridging-an-important-gap-in-the-sap-analytics-landscape/, Sep. 7, 2019, 8 pages.

Narayanan, SAP HANA and Hadoop Integration: ETL vs SDA vs SDI vs HANA Vora, retrieved from: https://blogs.sap.com/2017/04/05/sap-meets-big-data-sap-hana-and-hadoop-ecosystem/, Apr. 5, 2017, 11 pages.

SAP HANA Smart Data Integration, retrieved from: https://help.sap.com/viewer/eb3777d5495d46c5b2fa773206bbfb46/2.0.02/en-us/ba66eb6311e345a6b88cd90afdfe84ac.html, at least as early as Dec. 2019, 1 page.

Real time data replication in SAP HANA, retrieved from: https://www.tutorialspoint.com/Real-time-data-replication-in-SAP-HANA, at least as early as Dec. 2019, 2 pages.

SAP HANA—ETL Based Replication, retrieved from: https://www.tutorialspoint.com/sap_hana/etl_based_replication.htm, at least as early as Dec. 2019, 4 pages.

SAP HANA Smart Data Access(1): A brief introduction to SDA, retrieved from: https://blogs.sap.com/2014/06/02/sap-hana-smart-data-access1-a-brief-introduction-to-sda/, Jun. 2, 2014, 13 pages.

SLT (SAP Landscape Transformation Replication Server) in SAP HANA, retrieved from: https://www.guru99.com/slt-sap-landscape-transformation-replication-server-in-sap-hana.html, at least as early as Dec. 2019, 12 pages.

Non-Final Office Action received in U.S. Appl. No. 16/713,194, filed Jun. 11, 2021, 21 pages.

Non-Final Office Action received in U.S. Appl. No. 16/713,850, filed Sep. 1, 2021, 18 pages.

Non-Final Office Action received in U.S. Appl. No. 16/713,929, filed Sep. 29, 2021, 29 pages.

Final Office Action received is U.S. Appl. No. 16/713,194, filed Nov. 29, 2021, 21 pages.

Notice of Allowance received in U.S. Appl. No. 16/713,850, filed Dec. 20, 2021, 7 pages.

Notice of Allowance received in U.S. Appl. No. 16/713,929, filed Mar. 4, 2022, 44 pages.

Notice of Allowance received in U.S. Appl. No. 17/646,982, filed Feb. 1, 2023, 36 pages.

(56)     References Cited

OTHER PUBLICATIONS

Non-Final Office Action received in U.S. Appl. No. 17/830,935,
filed Aug. 3, 2023, 29 pages.
Notice of Allowance, received in U.S. Appl. No. 17/830,935, filed
Nov. 8, 2023, 12 pages.

* cited by examiner

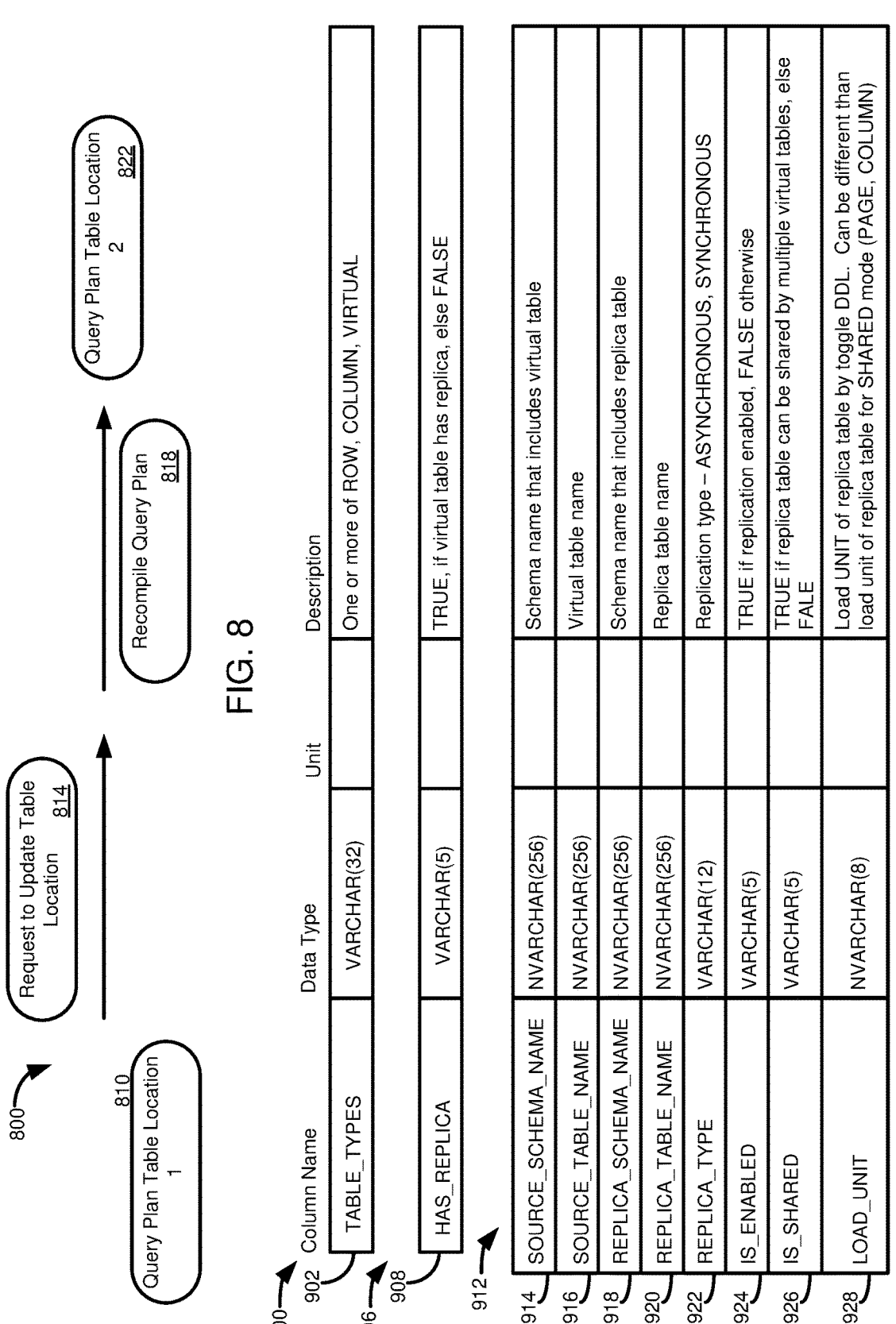

| Column Name | Data Type | Unit | Description |
|---|---|---|---|
| TABLE_TYPES | VARCHAR(32) | | One or more of ROW, COLUMN, VIRTUAL |
| HAS_REPLICA | VARCHAR(5) | | TRUE, if virtual table has replica, else FALSE |
| SOURCE_SCHEMA_NAME | NVARCHAR(256) | | Schema name that includes virtual table |
| SOURCE_TABLE_NAME | NVARCHAR(256) | | Virtual table name |
| REPLICA_SCHEMA_NAME | NVARCHAR(256) | | Schema name that includes replica table |
| REPLICA_TABLE_NAME | NVARCHAR(256) | | Replica table name |
| REPLICA_TYPE | VARCHAR(12) | | Replication type – ASYNCHRONOUS, SYNCHRONOUS |
| IS_ENABLED | VARCHAR(5) | | TRUE if replication enabled, FALSE otherwise |
| IS_SHARED | VARCHAR(5) | | TRUE if replica table can be shared by multiple virtual tables, else FALE |
| LOAD_UNIT | NVARCHAR(8) | | Load UNIT of replica table by toggle DDL. Can be different than load unit of replica table for SHARED mode (PAGE, COLUMN) |

| | | | |
|---|---|---|---|
| 962 | HOST | VARCHAR(64) | Host name |
| 964 | PORT | INTEGER | Internal port |
| 966 | SCHEMA_NAME | NVARCHAR(256) | Schema name that includes replica table |
| 968 | TABLE_NAME | NVARCHAR(256) | Replica table name |
| 970 | REPLICA_TYPE | VARCHAR(12) | Replication type (ASYNCHRONOUS, SYNCHROUNOUS) |
| 972 | SOURCE_SCHEMA_NAME | NVARCHAR(256) | Schema name that includes virtual table |
| 974 | SOURCE_TABLE_NAME | NVARCHAR(256) | Virtual table name |
| 976 | PART_ID | INTEGER | Partition ID (0 for non partition, partition 1 through n if partitioned) |
| 978 | REPLICATION_ENABLING_ PROCESS | DOUBLE | Percent | Progress of generating replica table |
| 980 | REPLICATION_STATUS | NVARCHAR(8) | Status of replication of replica table (DISABLED, ENBLING, ENABLED) |
| 982 | LAST_ENABLE_TIME | TIMESTAMP | Last replication enabling time |
| 984 | LAST_DISABLE_TIME | TIMESTAMP | Last replication disabling time |
| 986 | SHARE_COUNT | INTEGER | Counter | Number of virtual tables pointing to shared replica table – all users |

Figure 10:
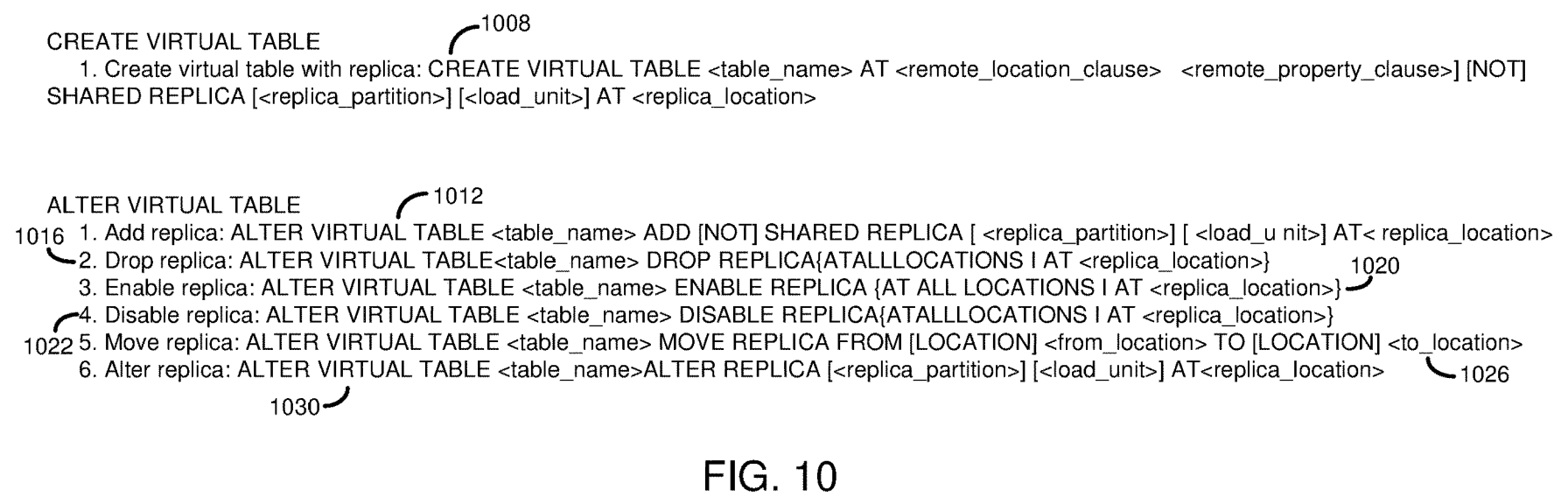

CREATE VIRTUAL TABLE

1. Create virtual table with replica: CREATE VIRTUAL TABLE <table_name> AT <remote_location_clause>  <remote_property_clause> [NOT]
SHARED REPLICA [<replica_partition>] [<load_unit>] AT <replica_location>    ⌐1008

ALTER VIRTUAL TABLE    ⌐1012

1016  1. Add replica: ALTER VIRTUAL TABLE <table_name> ADD [NOT] SHARED REPLICA [ <replica_partition>] [ <load_unit>] AT< replica_location>

2. Drop replica: ALTER VIRTUAL TABLE<table_name> DROP REPLICA{ATALLLOCATIONS I AT <replica_location>    1020

3. Enable replica: ALTER VIRTUAL TABLE <table_name> ENABLE REPLICA {AT ALL LOCATIONS I AT <replica_location>}

4. Disable replica: ALTER VIRTUAL TABLE <table_name> DISABLE REPLICA{ATALLLOCATIONS I AT <replica_location>}

1022 5. Move replica: ALTER VIRTUAL TABLE <table_name> MOVE REPLICA FROM [LOCATION] <from_location> TO [LOCATION] <to_location>

6. Alter replica: ALTER VIRTUAL TABLE <table_name>ALTER REPLICA [<replica_partition>] [<load_unit>] AT<replica_location>    ⌐1026

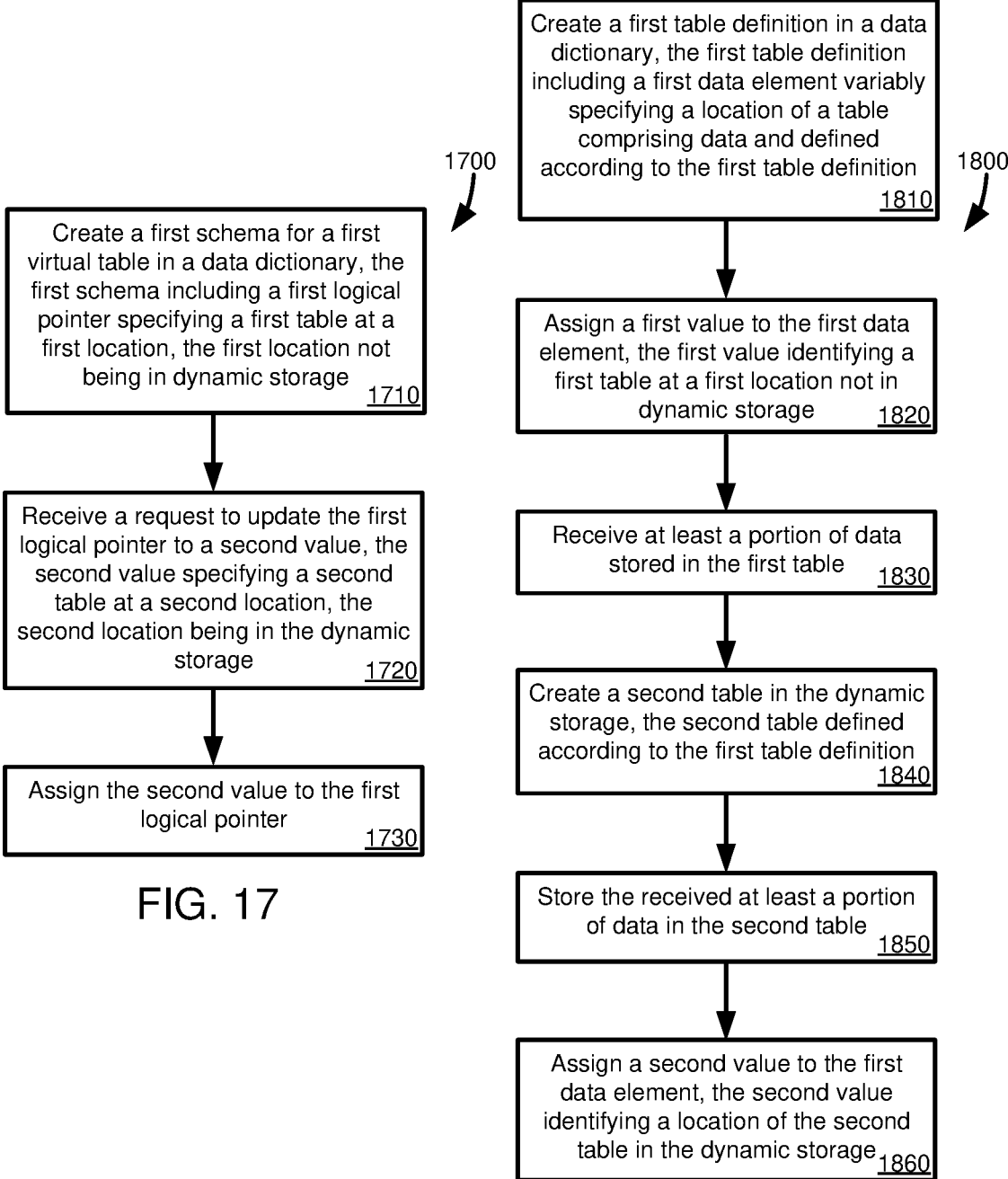

1700

Create a first schema for a first virtual table in a data dictionary, the first schema including a first logical pointer specifying a first table at a first location, the first location not being in dynamic storage
1710

Receive a request to update the first logical pointer to a second value, the second value specifying a second table at a second location, the second location being in the dynamic storage
1720

Assign the second value to the first logical pointer
1730

Create a first table definition in a data dictionary, the first table definition including a first data element variably specifying a location of a table comprising data and defined according to the first table definition
1810

Assign a first value to the first data element, the first value identifying a first table at a first location not in dynamic storage
1820

Receive at least a portion of data stored in the first table
1830

Create a second table in the dynamic storage, the second table defined according to the first table definition
1840

Store the received at least a portion of data in the second table
1850

Assign a second value to the first data element, the second value identifying a location of the second table in the dynamic storage
1860

FIG. 18

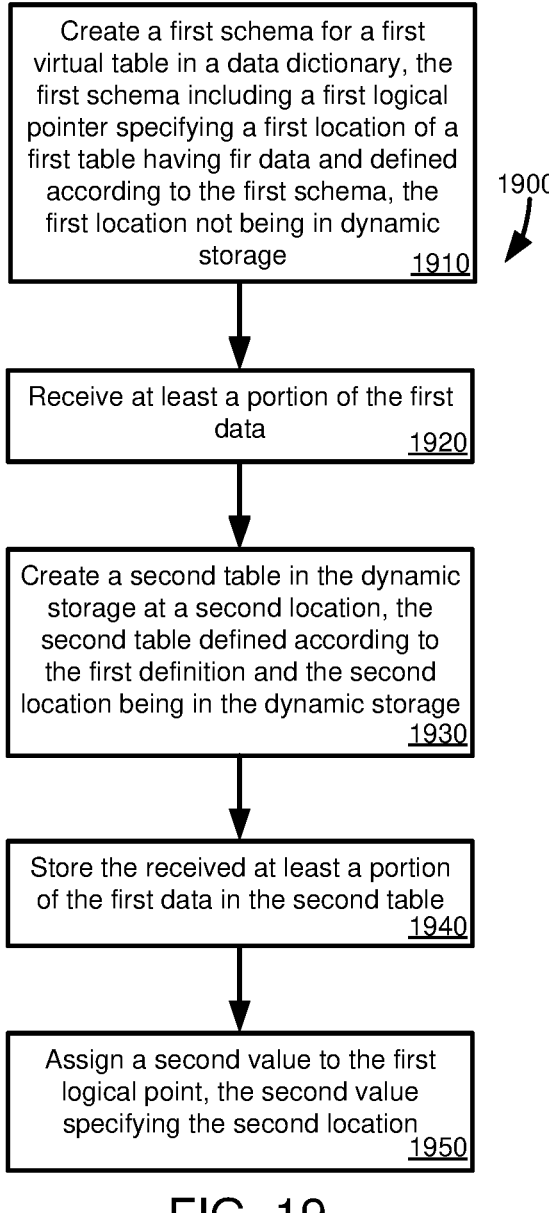

Create a first schema for a first virtual table in a data dictionary, the first schema including a first logical pointer specifying a first location of a first table having fir data and defined according to the first schema, the first location not being in dynamic storage    1910

1900

Receive at least a portion of the first data    1920

Create a second table in the dynamic storage at a second location, the second table defined according to the first definition and the second location being in the dynamic storage    1930

Store the received at least a portion of the first data in the second table    1940

Assign a second value to the first logical point, the second value specifying the second location    1950

FIG. 19

VIRTUAL DATABASE TABLES WITH UPDATABLE LOGICAL TABLE POINTERS

CROSS REFERENCE TO RELATED APPLICATION

This application is a continuation of U.S. patent application Ser. No. 17/830,935, filed Jun. 2, 2022, which in turn is a continuation of U.S. patent application Ser. No. 16/713,929, filed Dec. 13, 2019, now U.S. Pat. No. 11,379,486, which claims the benefit of U.S. Provisional Patent Application No. 62/903,459, filed on Sep. 20, 2019, all of which applications are hereby incorporated herein by reference.

FIELD

The present disclosure generally relates to managing data in a data store, such as a data store managed by a database management system. Particular implementations relate to table schemas that have logical pointers that can be used to reference tables at different locations.

BACKGROUND

It is increasingly common for enterprises to have data stored in a variety of systems, including in one or more local systems and in one or more cloud systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendors, differences can exist in what data is stored at a particular location and the schema used to store it.

In order to help address these issues, federated databases have been created. As opposed to a distributed database, which is a single database management system that involves multiple computer nodes (e.g., a master node and one or more slave nodes), a federated database includes functionality to make data from multiple, distinct database management systems (or other data sources) available through a common platform or interface. However, data in a federated database system typically needs to be retrieved from multiple different data sources. The need for data from different data sources can arise even in a single query. Although a federated database can make such data available, the process of sending requests to a remote system, having the data retrieved by the remote system, sending the data to the federation master, processing the query, and returning query results can be time consuming and resource intensive (such as using network bandwidth). Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for implementing virtual table schemas. A virtual table schema includes a logical pointer that is used to target a table that includes data and is defined according to the virtual table schema. Values assigned to the logical pointer can be used to target tables at different locations, such as in-memory storage or in dynamic storage of a database management system. The dynamic storage includes an in-memory buffer cache and persistent storage. The logical pointer can be updated to point to the in-memory storage or the dynamic storage, including based on use statistics. Similarly, a table having data for the virtual table can be transitioned between the in-memory buffer cache and the persistent storage, including based on use statistics for the virtual table. A value for the logical pointer can be updated when the table is transferred between the in-memory buffer cache and the dynamic storage.

In one aspect, a method is provided for updating a logical pointer for a virtual table schema. A first schema for a first virtual table is created in a data dictionary. The first schema includes a first logical pointer having a first value specifying a location of a first table having first data and defined according to the first schema. The first location is in in-memory storage of a central computing system hosting a database management system. The database management system includes dynamic storage. The first location is not in the dynamic storage. The dynamic storage includes an in-memory buffer cache and persistent storage, and data stored in the dynamic storage can be transferred between the in-memory buffer cache and the persistent storage.

A request to update the first logical pointer to a second value is received. The second value specifies a second table at a second location. The second table is defined according to the first schema, and the second location is in the dynamic storage. The second value is assigned to the first logical pointer.

In a further aspect, a further method is provided for updating a logical pointer for a virtual table schema. A first table definition is created in a data dictionary. The first table definition includes a first data element variably specifying a location of a table having data and defined according to the first definition. A first value is assigned to the first data element. The first value identifies a first table at a first location. The first table is defined according to the first table definition, and is located in in-memory storage of a central computing system hosting a database management system that includes dynamic storage. The first location is not in the dynamic storage. Data stored in the dynamic storage can be transferred between an in-memory buffer cache and persistent storage.

At least a portion of data stored in the first table is received. A second table is created in the dynamic storage. The second table is defined according to the first table definition. The received at least a portion of data is stored in the second table. A second value is assigned to the first data element. The second value identifies a location of the second table in the dynamic storage.

In a yet further aspect, an additional method is provided for updating a logical pointer for a virtual table schema. A first schema for a first virtual table is created in a data dictionary. The first schema includes a first logical pointer specifying a first location of a first table having first data and defined according to the first schema. The first location is located in in-memory storage of a central computing system hosting a database management system. The database management system includes dynamic storage. The first location is not in the dynamic storage. Data stored in the dynamic storage can be transferred between an in-memory cache and persistent storage.

At least a portion of the first data is received. A second table is created in the dynamic storage at a second location. The second table is defined according to the first schema. The received at least a portion of the first data is stored in the second table. A second value is assigned to the first logical pointer. The second value specifies the second location.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 8 is a diagram illustrating a scenario for recompiling a query plan when a logical pointer for a virtual table schema is updated to target a different table.

FIGS. 9A and 9B provide example column definitions that can be used with database artifacts useable in managing virtual table schemas or replica tables used with virtual table schemas.

FIG. 10 provides example query language statements for performing actions related to virtual table schemas.

FIGS. 17-19 are flowcharts illustrating operations in disclosed embodiments for updating a logical pointer of a virtual table schema.

DETAILED DESCRIPTION

Example 8)—Overview

Figure 1:
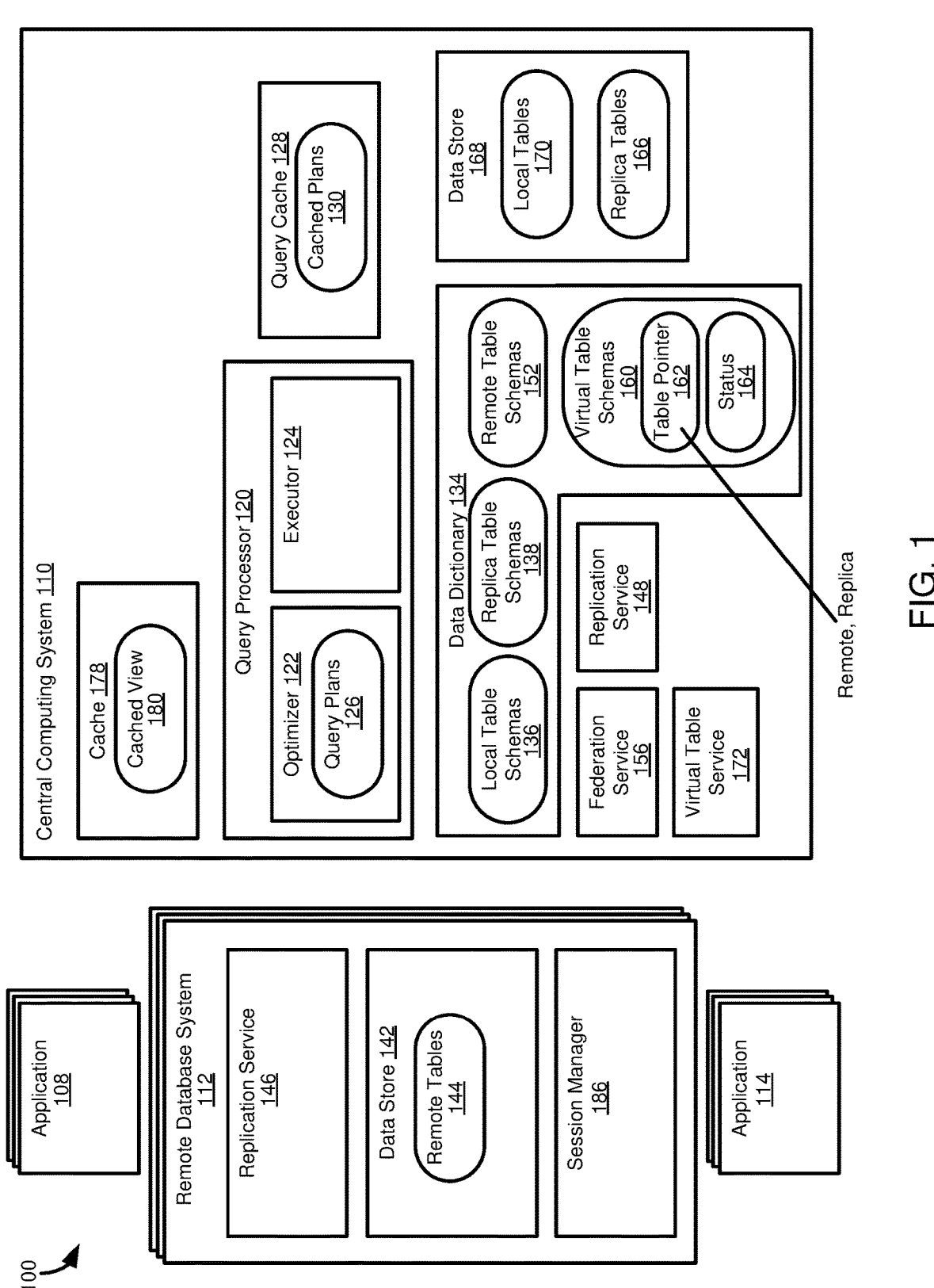
FIG. 1) is a diagram illustrating a computing architecture having virtual table schemas with logical pointers that can target remote tables or replica tables.

It is increasingly common for enterprises to have data stored in a variety of systems, including in one or more local systems and in one or more cloud systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendors, differences can exist in what data is stored at a particular location and the schema used to store it.

In order to help address these issues, federated databases have been created. As opposed to a distributed database, which is a single database management system that involves multiple computer nodes (e.g., a master node and one or more slave nodes), a federated database includes functionality to make data from multiple, distinct database management systems (or other data sources) available through a common platform or interface. However, data in a federated database system typically needs to be retrieved from multiple different data sources. The need for data from different data sources can arise even in a single query. Although a federated database can make such data available, the process of sending requests to a remote system, having the data retrieved by a remote system, sending the data to the federation master, processing the query, and returning query results can be time consuming and resource intensive (such as using network bandwidth).

In addition, if it is desired to alter the location of data, it may be necessary to significantly alter a database system, and queries that have been prepared based on a particular database schema. For example, if a replica of a table that exists within a federated database is to be used at a federation master (e.g., a central computing system that hosts a database management system that acts as a federation master), a database artifact (e.g., a data dictionary entry) for the remote table may need to be dropped and a table schema added for the replica table in the database management system.

Queries that referenced the table located on the federated database system may need to be rewritten and recompiled. Thus, once a database schema has been created, including determining which tables will be locally accessible and which will be remotely accessed, it can be very difficult and time consuming to modify the database schema. Thus, some queries may execute more slowly than desired, if data that is frequently accessed or is associated with a query of high importance is located on a remote system. Conversely, maintaining little used or low priority data on a federation master can result in excess costs (for example, if an enterprise is paying a third party to host data for a cloud-based database system) or unnecessary equipment expenses if the enterprise hosts its own database system (cloud or otherwise). Accordingly, room for improvement exists.

The present disclosure provides technologies that can help address the issues noted above. In a particular embodiment, the present disclosure provides virtual tables, where a virtual table can be represented by a database schema object (e.g., an entry in a data dictionary) which includes a logical pointer to a table (e.g., containing the actual data associated with the table schema) that should be used with the table definition/schema object. The logical pointer can be dynamically updated between two or more locations. Locations can include a table on a remote computing system (which can be a federated database), a replica table that replicates data from a remote table on the remote computing system, a local table, or a cached table. In addition, for replica tables, the type of replication or location of the replica table can be changed, including changing whether the replica table is stored locally in main memory, stored locally on disk, stored locally and managed between main memory and disk access, or stored on another remote computing system, such as a data lake.

When a location of a table (the data associated with the dictionary object) is changed, the location can be updated in the dictionary object. Thus, changes to the location of the table do not need to result in changes to the database schema—a table schema can be updated (e.g., via an ALTER TABLE DDL statement), but need not be dropped and added. Query optimizers can recompile query plans that involve such virtual tables to account for changes in the table location. In some cases, a change to a table schema definition can result in automatic recompilation of stored query plans that use the affected table schema. In this way, future queries can be executed using the updated query plan. In other cases, query plans are not automatically recompiled, but are recompiled upon the occurrence of an event, such as a request to execute a query. The request to execute the query can generate an indication that the compiled query plan is out of date, in which case it can be recompiled and then executed.

In one scenario, it may be desired to change a table from being remotely accessed via federation to having a local (or, at least, a table that is natively available without federation) replica of the table. However, once a request to update a remote (or federated) table to a replica table is received, it can take time for the replica table to become available (e.g., for the data to be transferred from the remote system and stored in the replica table). Accordingly, aspects of the present disclosure provide that a data dictionary entry for a table can be updated to indicate that the table is a replica table, but the table that the entry points to does not change until the replica table is available. In other cases, queries are rejected or held until the replica is available.

In further aspects, the present disclosure provides replica tables that can be shared by multiple schemas, including by schemas for different users in a multitenant database system (including a cloud database system that is operated in a multitenant manner). In some cases, when a schema for a virtual table points to a remote table, all users (e.g., tenants) can access the remote table. As the data is being remotely accessed anyway, there is no performance penalty to maintaining separate references to the remote table. If the schema of the virtual table is changed to point to a replica table, all of the database schemas can point to the replica table. That is, a replica table need not be created for each database schema, and all of the database schemas can use the replica table, at least in some cases, even if the change to target a replica table was requested by, or on behalf of, a single user.

However, other configurations are possible. For example, in one scenario, users can share a replica table when changes are not made to the replica table (e.g., the table is read only). If a user attempts to write to the table, the schema of the virtual table used by that user can be updated to point to a different table than the other users, which different table can be a remote table or a replica table, depending on implementation or configuration. In further scenarios, when a request is made to create a replica table for a virtual table, it can be specified in the request that the replica table is not to be shared.

In some implementations, when a virtual table is selected to be replicated, the entire table is replicated. In other cases, only portions of a table are replicated, and remaining portions can be accessed in another manner. For instance, particular table partitions, columns, or column values can be selected for replication. Requests to access data associated with replicated data are serviced by the replica table. Requests to access data that is not replicated can be serviced in another manner, such as by federation (e.g., retrieving data from a remote data source, including using the Smart Data Access protocol of SAP SE, of Walldorf, Germany) or retrieving table data from a cache.

Typically, replica tables used by virtual table schemas are not directly accessible by users. In addition, in some cases, even after a replica table is created, it may be desired to allow users to directly access the remote table (serving as the source for the replica table) on the remote system. Accordingly, commands in a query language can be provided to force access to a remote table instead of using the replica table. For example, the following command can be added to a SQL statement (e.g., a query, such as using a SELECT statement): NO_VIRTUAL_TABLE_REPLICA. Similarly, a session-level command or variable may be provided to specify that any query language operations during the session should use remote tables instead of replica tables, for virtual table schemas that point to replica tables. For example, a VIRTUAL_TABLE_REPLICA session variable can store a Boolean value indicating whether the replica table should be used. The Boolean value can have a default value, such as TRUE (i.e., the replica table should be used).

Users (which can be end users, database administrators, administrators of a cloud system, etc., depending on implementation) can decide, in some cases, what a target table for a virtual table schema will be, and can decide when and how to change the designation. In other cases, a database system can automatically determine the type of target table for a virtual table schema, and when and how the target table type should be updated. For example, the database management system can determine when execution parameters for execution of a particular query exceed a threshold. If the threshold is exceeded, it can be determined whether the query involves virtual tables that point to remote tables. If so, and the remote operations contribute significantly to the query execution time, a replica table can be created, and the virtual table schema can be updated to point to the replica table. If space on the system that holds the replica table becomes an issue, the database system can analyze virtual tables to determine whether any target tables should be converted from replica tables to remote tables. For instance, cache management techniques, such as a least recently used (LRU) algorithm can determine which virtual tables to convert from pointing to a replica table to pointing to a remote table (e.g., a virtual table whose target replica table was least recently used can be converted to point to a remote table, and the replica table removed).

The disclosed technologies can provide a number of advantages. By allowing a user to select whether a virtual table targets a remote table or a replica table (or a cached table), the user can choose whether longer query times associated with remote tables are acceptable. That is, for cost reasons, or based on other considerations (e.g., the desire to maintain the source tables for particular data locally, on the remote system, rather than on a central computing system that maintains the virtual tables), it may be undesirable to replicate all data to a central computing system or other system that integrates data from multiple sources. Costs can also be associated with transmitting data, and so at some point it may be more cost effective to store replicated data in a cloud system than to send the data from the remote (source) system every time the data is accessed. Similarly, the user may select (or configure algorithms that automatically select) whether replica table data should be maintained in memory, in a dynamic store (that migrates data between an in-memory buffer and disk storage), on disk, in a data lake, etc.

Example 9)—Example Architecture for Virtual
Tables Having Remote or Replica Target Tables FIG. 1 illustrates an architecture 100 in which disclosed embodiments can be implemented. The basic architecture 100 of FIG. 1 includes a number of features that can be common to different embodiments of the disclosed technologies, including one or more applications 108 that can access a central computing system 110, which can be a cloud computing system. The central computing system 110 can act as such by providing access to data stored in one or more remote database systems 112. In turn, the remote database systems 112 can be accessed by one or more applications 114. In some cases, an application 114 can also be an application 108. That is, some applications may only (directly) access data in the central computing system 110, some applications may only access data in a remote database system 112, and other applications may access data in both the central computing system and in a remote database system.

Other Examples described herein can include components in addition to the applications 108, 114, the remote database systems 112, and the central computing system 110. In addition, components 108, 110, 112, 114 of the architecture, particularly the central computing system 110, can be configured differently between the different Examples, as will be further described.

The central computing system 110 can include a query processor 120. The query processor 120 can include multiple components, including a query optimizer 122 and a query executor 124. The query optimizer 122 can be responsible for determining a query execution plan 126 for a query to be executed using the central computing system 110. The query plan 126 generated by the query optimizer 122 can include both a logical plan indicating, for example, an order of operations to be executed in the query (e.g., joins, projections) and a physical plan for implementing such operations. Once developed by the query optimizer 122, a query plan 126 can be executed by the query executor 124. Query plans 126 can be stored in a query plan cache 128 as cached query plans 130. When a query is resubmitted for execution, the query processor 120 can determine whether a cached query plan 130 exists for the query. If so, the cached query plan 130 can be executed by the query executor 124. If not, a query plan 126 is generated by the query optimizer 122. In some cases, cached query plans 130 can be invalidated, such as if changes are made to a database schema, or at least components of a database schema (e.g., tables or views) that are used by the query.

A data dictionary 134 can maintain one or more database schemas for the central computing system 110. In some cases, the central computing system 110 can implement a multitenant environment, and different tenants may have different database schemas. In at least some cases, at least some database schema elements can be shared by multiple database schemas.

The data dictionary 134 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 134 can include local table schemas 136, which can represent tables that are primarily maintained on the central computing system 110. The data dictionary 134 can include replica table schemas 138, which can represent tables where at least a portion of the table data is stored in the central computing system 110 (or which is primarily managed by a database management system of the central computing system, even if stored other than on the central computing system, such as being stored in a data lake or in another cloud service). Tables having data associated with replica tables schemas 138 typically will periodically have their data updated from a source table, such as a remote table 144 of a data store 142 of a remote database system 112.

Replication can be accomplished using one or both of a replication service 146 of the remote database system 112 or a replication service 148 of the central computing system 110. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany.

As explained in Example 1, in some cases, data in a remote database system 112 can be accessed by the central computing system 110 without replicating data from the remote database system, such as using federation. The data dictionary 134 can store remote table schemas 152 for remote tables, such as a remote table 144 of a remote database system 112. Data in the remote table 144 can be accessed using a federation service 156, such as using the Smart Data Access protocol of SAP SE, of Walldorf, Germany. The federation service 156 can be responsible for converting query operations into a format that can be processed by the appropriate remote database system 112, sending the query operations to the remote database system, receiving query results, and providing the query results to the query executor 124.

The data dictionary 134 can include virtual table schemas 160. Virtual table schemas 160 can be associated with a table pointer 162 and optionally with status information 164. The table pointer 162 can be a logical pointer used to identify what table should be accessed for data of the corresponding virtual table schema 160. For example, depending on the state of the table pointer 162, the table pointer can point to the remote table 144 of a remote database system 112 or a replica table 166 (which can be generated from the remote table 144) located in a data store 168 of the central computing system 110. The data store 168 can also store data for local tables 170, which can be defined by the local table schemas 136.

As will be further described, the table pointer 162 can be changed between the remote table 144 and the replica table 166. In some cases, a user can manually change the table pointed to by the table pointer 162. In other cases, the table pointer 162 can be automatically changed, such as in response to the detection of defined conditions.

The status information 164 can include an indicator identifying a virtual table schema 160 as being associated with a remote table 144 or a replica table 166. The status information 164 can also include information about the replication status of a replica table 166. For example, once a request is made to change the table pointer 162 to point to a replica table 166, it may take time before the replica table is ready for use. The status information 164 can include whether a replication process has been started, has been completed, or a progress status of generating the replica table 166.

Changes to virtual table schemas 160 and managing replica tables 166 associated with virtual table schemas can be managed by a virtual table service 172. Although shown as a separate component of the central computing system 110, the virtual table service 172 can be incorporated into other components of the central computing system 110, such as the query processor 120 or the data dictionary 134.

When a query is executed, the query is processed by the query processor 120, including executing the query using the query executor 124 to obtain data from one or both of the data store 142 of the remote database system 112 or the data store 168 of the central computing system 110. Query results can be returned to the application 108. Query results can also be cached, such as in a cache 178 of the central computing system 110. The cached results can be represented as cached views 180 (e.g., materialized query results).

The applications 114 can access data in the remote database system 112, such as through a session manager 186. The applications 114 can modify the remote tables 144. When a table pointer 162 of a virtual table schema 160 references a remote table 144, changes made by the applications 114 are reflected in the remote table. When a table pointer 162 references a replica table 166, changes made by the applications 114 can be reflected in the replica table using the replication service 146 or the replication service 148.

Figure 2:
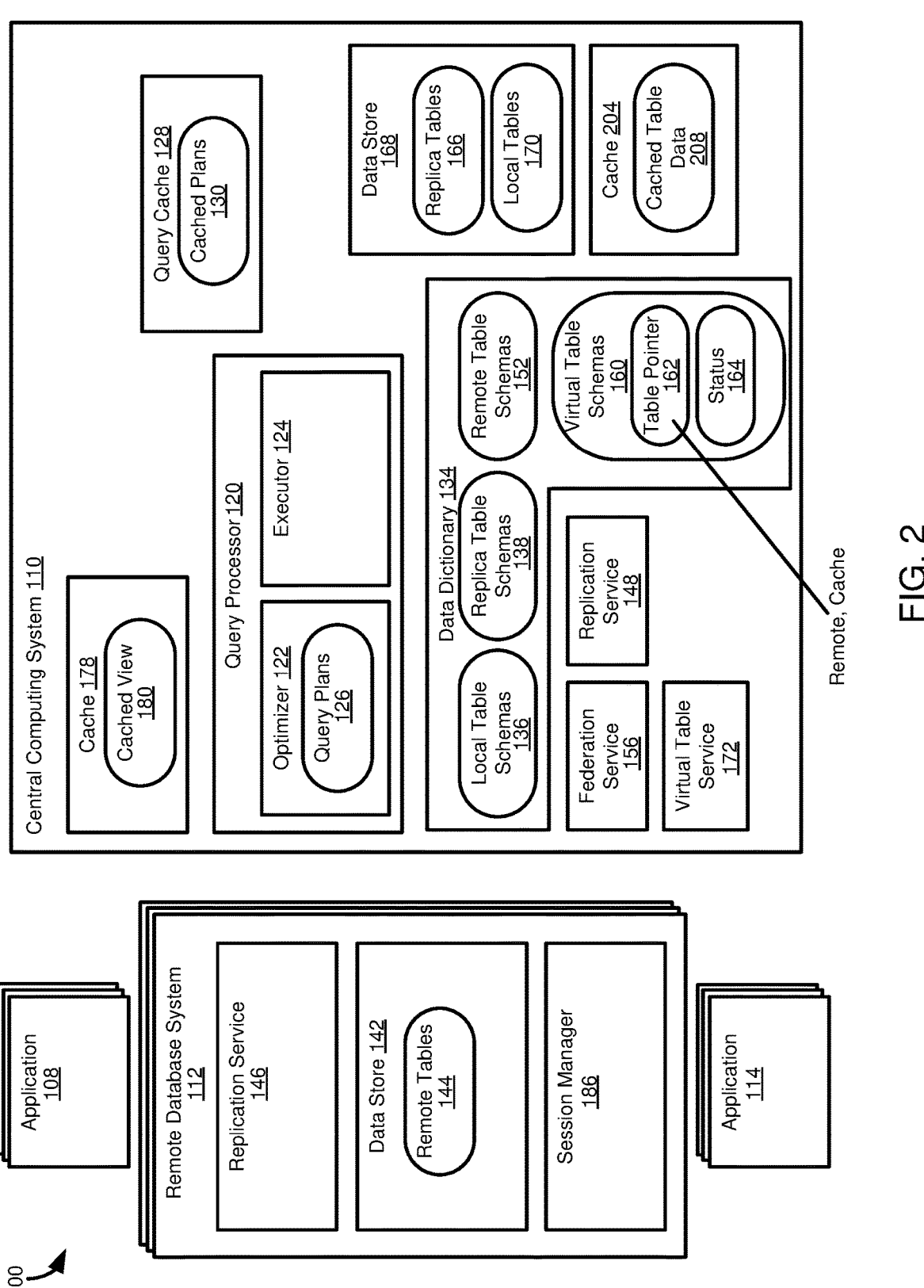
FIG. 2) is a diagram illustrating a computing architecture having virtual table schemas with logical pointers that can target remote tables or cached tables.

Example 10)—Example Architecture for Virtual Tables Having Remote or Cached Target Tables FIG. 2 illustrates an example architecture 200 that is generally analogous to the architecture 100 of FIG. 1. Components that are the same between the architectures 100 and 200 maintain the numbering of FIG. 1. Corresponding components between FIGS. 1 and 2 can have the functions as discussed in Example 2, except as modified by any discussion in this Example 3.

Compared with the architecture 100, the virtual table schemas 160 can reference remote tables 144 or data stored in a virtual table cache 204. Although the data store 168 can store replica tables 166, the replica tables are referenced by the replica table schemas 138 and not the virtual table schemas 160.

The virtual table cache 204 can include cached table data 208, which can contain all or a portion of data from a remote table 144 retrieved in response to a prior request for data from a remote table. When a portion of data from a remote table 144 is stored in the cached table data 208, the data can represent a portion of a query that was sent to the remote database system 112. If another virtual table schema 160 references the same remote table 144 (or has its table pointer 162 updated to reference a table in the cache 204), if present in the cache.

In at least some cases, if a table, or portion thereof, is specified by a virtual table schema 160, and used in a particular query plan 126 or 130, but the data is not present in the cache 204, the data can be retrieved from the remote table 144 and stored in the cache. In other cases, when a virtual table schema 160 specifies that caching is to be used, data for the table can be prospectively retrieved, such as from a remote table 144, and included in the virtual table cache 204 (e.g., before a request for data associated with that virtual table schema is received).

In particular implementations, a size can be specified for the cache 204. If the size of the cache 204 would be exceeded, cached table data 208 can be deleted from the cache. Typically, data deletion is managed using a suitable cache management policy, such a policy using a least recently used (LRU) algorithm, a FIFO algorithm, or another algorithm. Tables can be associated with priorities, such that lower priority tables are more likely to be evicted from the cache 204. A cache management policy can also associate particular users, query plans 126, 130, or other factors with higher or lower priorities.

Cache management policies can also include policies for removing stale data, or for updating stale data. For example, if data in the cache 204 is older than a threshold (which can be global or set for a particular table), updated data can be retrieved and stored in the cache. Or, the table can be flagged as associated with stale data, and new data fetched and cached upon the next request for the data. If a query is received that requests data associated with a virtual table schema 160 whose data was deleted from the cache 204, the data can be re-retrieved from the remote table 144, provided in response to the query, and stored in the cache.

In some cases, a table pointer 162 for a virtual table schema 160 can point to a table in the cache 204. In other cases, the table pointer 162 does not directly point to a particular table in the cache 204. For example, the table pointer 162 can point to the remote table 144. However, an indicator, such as a flag, for the virtual table schema 160 can be updated to reflect that data from the remote table 144 is cacheable. When data associated with the virtual table schema 160 is requested, the cache 204 can be first checked for the requested data and, if the data is not present, the data can be requested from the remote table 144 using the value for the remote table in the table pointer 162. In further implementations, a "cache" option can be set such that all, or a selected of subset of the virtual table schemas 160, are processed by first checking the cache 204 and then following table pointers 162 to remote tables 144 if requested data is not present in the cache.

When table pointers 162 refer to tables in the cache 204, when a table is removed from the cache, the corresponding table pointer can be updated to reflect another location from which table data can be obtained, such as a value specifying a location of a remote table 144. Similarly, if caching is disabled for a particular virtual table schema 160, the table pointer 162 can be updated with a value specifying a table at another location, such as a location of a remote table 144. In some cases, a virtual table schema 160 can store a location of a remote table 144 so that a value specifying that location can be used for the table pointer 162 when no other value is available for, or explicitly assigned to, the table pointer.

In some cases, data associated with a virtual table schema 160 can be partitioned among multiple tables, where the partitioning can be specified in the virtual table schema or in another manner. If data for a virtual table schema 160 is partitioned, all of the data can be specified for use with the cache 204, or a portion of the data can be specified for use with the cache. Similarly, even if all data associated with a virtual table schema 160 is specified for use with the cache 204, data fetched and stored in the cache 204 can be handled on a partition basis. That is, for example, if a query requests data for a first partition, but data for a second partition is not needed for the query, only the first partition data is fetched and stored in the cache 204. In other cases, data for all partitions is stored in the cache 204, either prospectively or in response to a request for data associated with at least one partition of the table.

Figure 3:
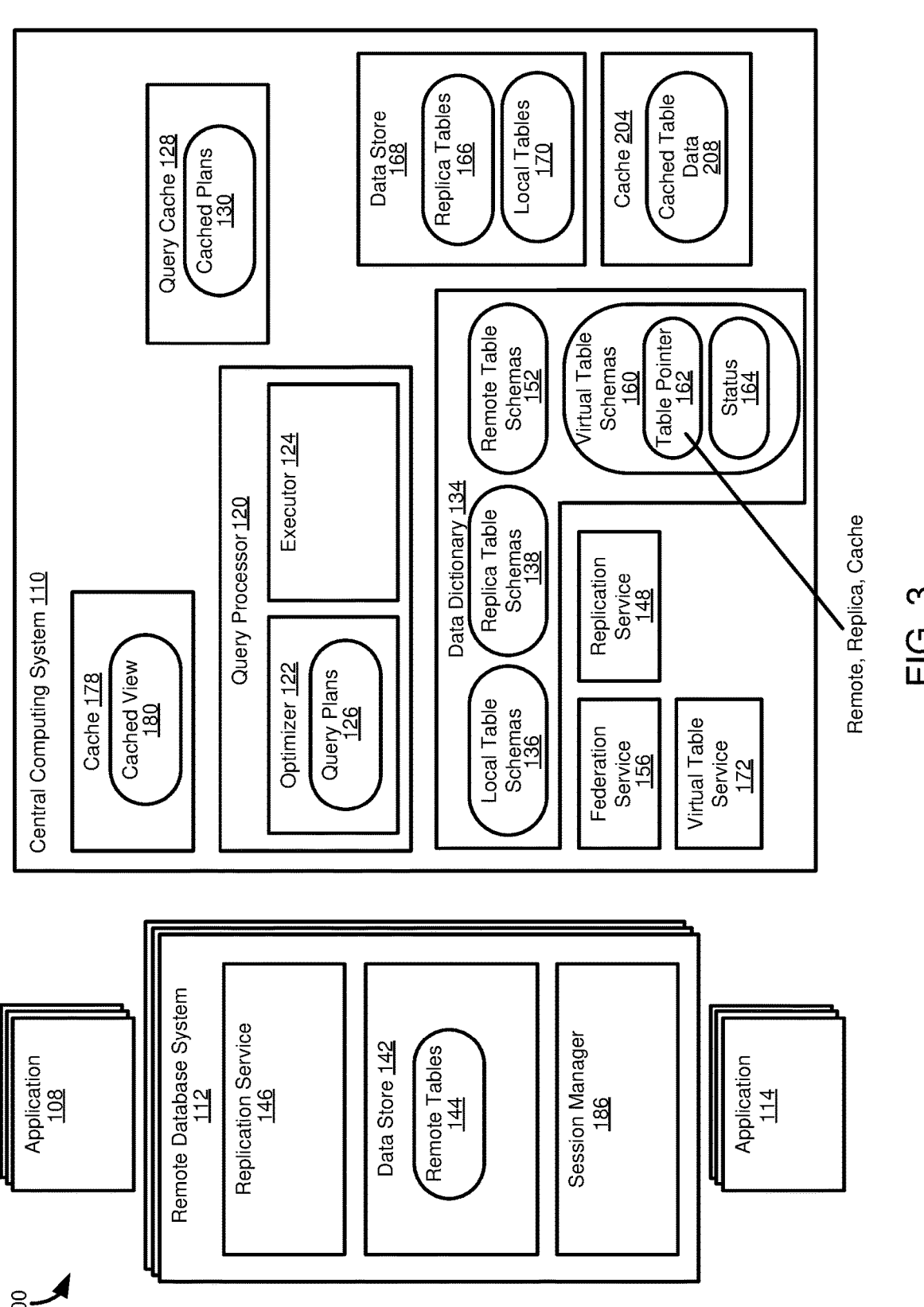
FIG. 3) is a diagram illustrating a computing architecture having virtual table schemas with logical pointers that can target remote tables, replica tables, or cached tables.

Example 11)—Example Architecture for Virtual Tables Having Remote, Replica, or Cache Target Tables FIG. 3 illustrates an example architecture 300 that is generally analogous to the architecture 200 of FIG. 2. Components that are the same between the architecture 300 and the architectures 100, 200 maintain the numbering of FIGS. 1 and 2. Components of the architecture 300 that correspond to components of FIGS. 1 and 2 can have the functions as discussed in Examples 2 and 3, except as modified by any discussion in this Example 4.

The virtual table schemas 160 of the architecture 300 are configured to reference the remote tables 144, the replica tables 166 (which are created using data from the remote tables 144), or the cached table data 208. A user may selectively change the table pointer 162 for a given virtual table schema 160 to reference a remote table 144, a replica table 166, or cached table data 208. In other cases, particular criteria can be defined for when a table pointer 162 will be updated to a different target table type, as will be further described in the present disclosure.

Example 5)—Example Architecture for Virtual Tables with Available Data Lakes

Figure 4:
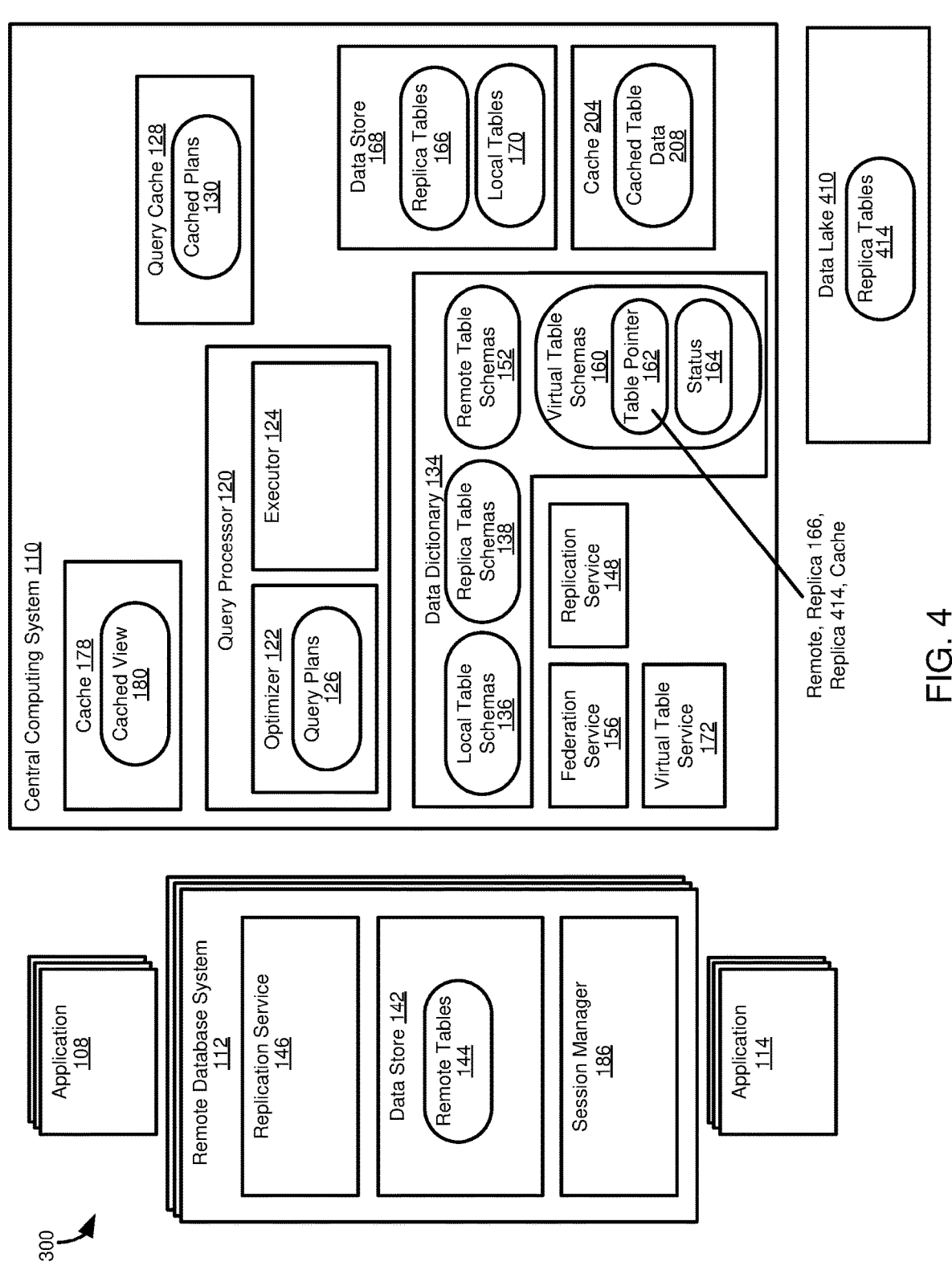
FIG. 4) is a diagram illustrating a computing architecture having virtual table schemas with logical pointers that can target remote tables, replica tables, or cached tables, and where replica tables can be stored in a data lake.

FIG. 4 illustrates an example architecture 400 that is generally analogous to the architecture 300 of FIG. 3. Components that are the same between the architecture 400 and the architectures 100, 200, or 300 maintain the numbering of FIGS. 1-3. Components of FIG. 4 that correspond to components of any of FIGS. 1-3 can have the functions as discussed in Examples 2-4, except as modified by any discussion in this Example 5.

The architecture 400 includes a data lake 410. The data lake 410 can include data in a variety of formats, including structured data, semi-structured data, unstructured data, or binary data. Of particular relevance, the data lake 410 can store replica tables 414. The replica tables 414 can be analogous to the replica tables 166. As shown, the data lake 410 is separate from the central computing system 110. In other cases, the data lake 410 can be integrated into the central computing system 110.

The replica tables 166 can optionally continue to be included in the central computing system 110, and can be replica tables corresponding to replica table schemas 138 or replica tables that are targets of a table pointer 162 or a virtual table schema 160. Thus, in the embodiment of FIG. 4, a table pointer 162 can point to at least a replica table 414 of the data lake 410 or a remote table 144. In particular implementations, a table pointer 162 may also point to a replica table 166 or cached table data 208.

When a table pointer 162 can point to a replica table 144 or a replica table 166, a user may choose the location of the replica table, in some cases. In other cases, the location of the replica table can be determined according to particular criteria, such as client cost/access preferences, frequency of use, or other considerations. For example, frequently used replica tables 414 may be moved to the replica tables 166. Or, infrequently used replica tables 166 can be moved to the data lake 410.

Queries that retrieve data from virtual tables (i.e., defined by a virtual table schema 160) stored on a data lake 410 may have reduced performance compared with data stored in a replica table 166 of the central computing system 110. However, the queries may execute more quickly than if the virtual table schema 160 referenced a remote table 144. In particular, the data lake 410 may be more closely integrated with the central computing system 110 than a remote database system 112. The data lake 410 and central computing system 110 may function as, or more similarly to, a distributed database than a federated database, as when data is retrieved from a remote database system 112.

Example 6—Example Architecture, Having Dynamic Storage, for Virtual Tables

Figure 5:
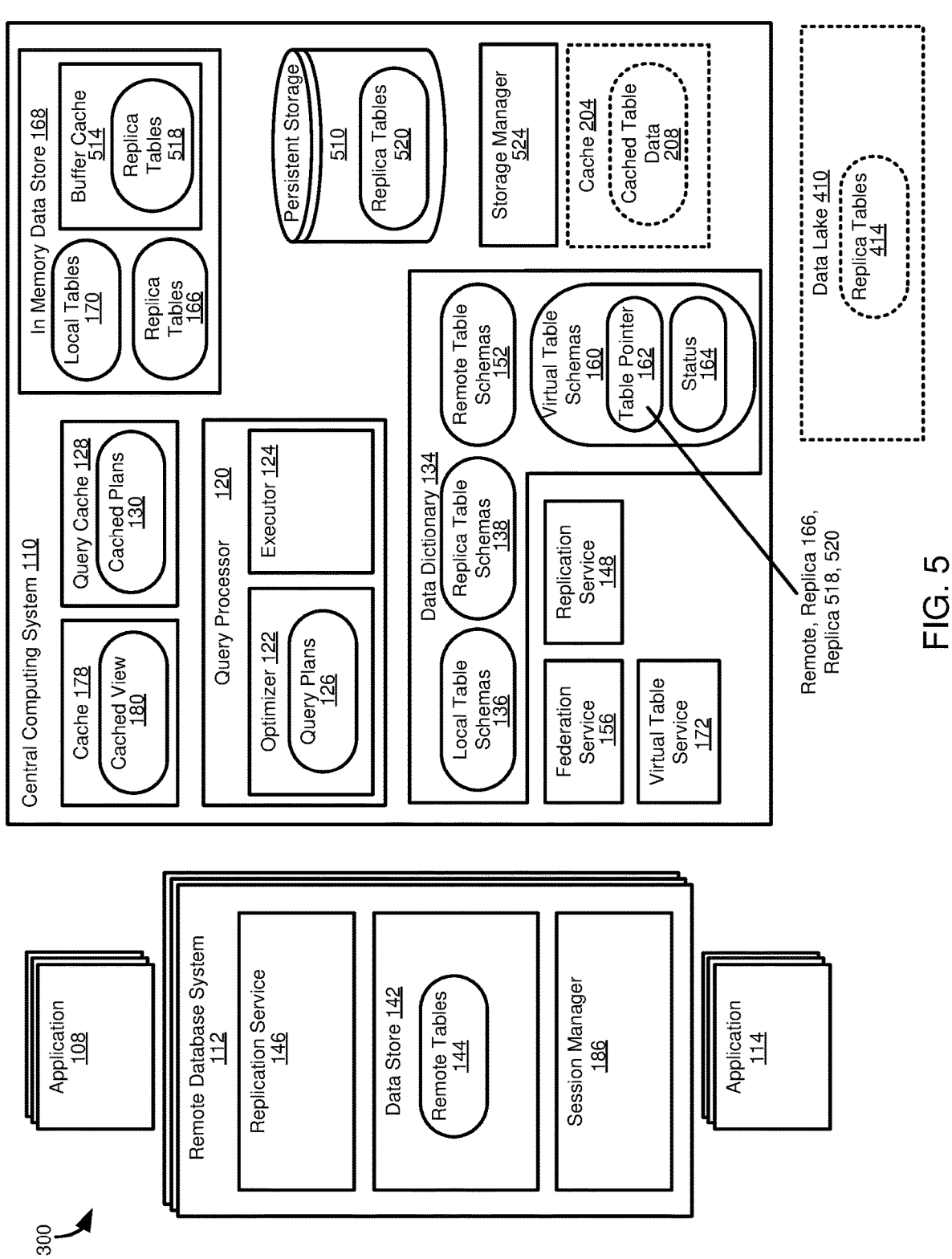
FIG. 5) is a diagram illustrating a computing architecture having virtual table schemas with logical pointers that can target remote tables, replica tables, or cached tables, and where replica tables can be stored in dynamic storage.

FIG. 5 illustrates an example architecture 500 that is generally analogous to the architecture 400 of FIG. 4. Components that are the same between the architecture 500 and the architectures 100, 200, 300, 400 maintain the numbering of FIGS. 1-4. Components of the architecture 500 that correspond to those in any of FIGS. 1-4 can have the functions as discussed in Examples 2-5, except as modified by any discussion in this Example 6. The architecture 500 optionally includes the data lake 410 or the cache 204.

The architecture 500 includes dynamic storage, in the form of the data store 168, which is specified as an in-memory data store (e.g., the stored information is maintained in RAM), and physical storage 510 (e.g., data stored on disk, tape, optical, or other physical media). In a particular example, the dynamic storage is implemented using the Native Storage Extension technology of SAP SE, of Walldorf, Germany. The data store 168 can maintain particular tables, such as those associated with the replica table schemas 138 or specified virtual table schemas 160, as the replica tables 166, which are stored in memory.

The data store 168 includes a buffer cache 514, which uses a, typically assigned, portion of the memory available in the in-memory data store 168. The buffer cache 514 includes replica tables 518. Data can be transferred to and from the buffer cache 514, including to and from the physical storage 510, which store replica tables 520. Transfer of information between the buffer cache 514 and the physical storage 510 can be mediated by a storage master 524 (e.g., which manages dynamic storage).

As has been described, maintaining replica tables 166 corresponding to the remote tables 144 can improve query performance, and can reduce costs associated with transferring data between a remote database system 112 and the cloud computing system 110. However, maintaining all data in memory can be cost prohibitive, and well as presenting technical challenges. Providing the buffer cache 514 allows users to choose whether replica tables referenced by a table pointer 162 should be maintained fully in memory, as replica tables 166, or should be included in a dynamic storage system managed by the storage master 524 where data can be transferred between the buffer cache 514 and the physical storage 510 based on various criteria.

Initially, virtual table schemas specified to point to replica tables 518, 520 can have associated data stored in the buffer cache 514. If the buffer cache size 514 is or would be exceeded for a particular operation, the storage manager 524 can determine data to be moved from the buffer cache to the physical storage 510. In managing the buffer cache 514, the storage master 524 can use suitable cache management algorithms, including an LRU algorithm. However, management of the buffer cache 514 can incorporate other factors, such as priority levels specified for particular virtual tables 160, queries, users, etc.

The size of the buffer cache 514 can be configurable, including being user configurable. By increasing the size of the buffer cache 514, more replica tables 518 can be maintained, but less data may be available for local tables 170 or replica tables 166 in the data store 168. Decreasing the size of the buffer cache 514 may result in more cache misses for particular data, which can increase query times if data needs to be retrieved from physical storage 510, and can increase cache volatility. However, virtual table schemas 160 are beneficial in that, like changes to the table pointer 162, changes to the where replica data is stored can be abstracted from applications 108, and changes to the data dictionary 134 are not needed. In some cases, the query optimizer 122 can recompile query plans 130 when the location of replica table data changes (including changes between data being stored as a replica table 166, in a replica table 518, or in a replica table 520). Thus, the disclosed technologies facilitate changes to a database that achieve particular performance and cost objectives.

In addition to managing what data is stored in the buffer cache 514 and in the physical storage 510, the storage master 524, or another component of the central computing system 110, can determine when replica tables should be stored in memory as replica tables 166 or in a dynamic storage component that uses the replica tables 518, 520. While a user may manually make such a change, the storage master 524 may change data between being stored in a replica table 166 and in replica tables 518, 520. For example, if a particular table 518 is consistently used for queries, it can be changed to a table 166. Similarly, if tables 166 are not accessed sufficiently frequently, they can be transitioned to dynamic storage and can be stored in the replica tables 518, 520.

Figure 6:
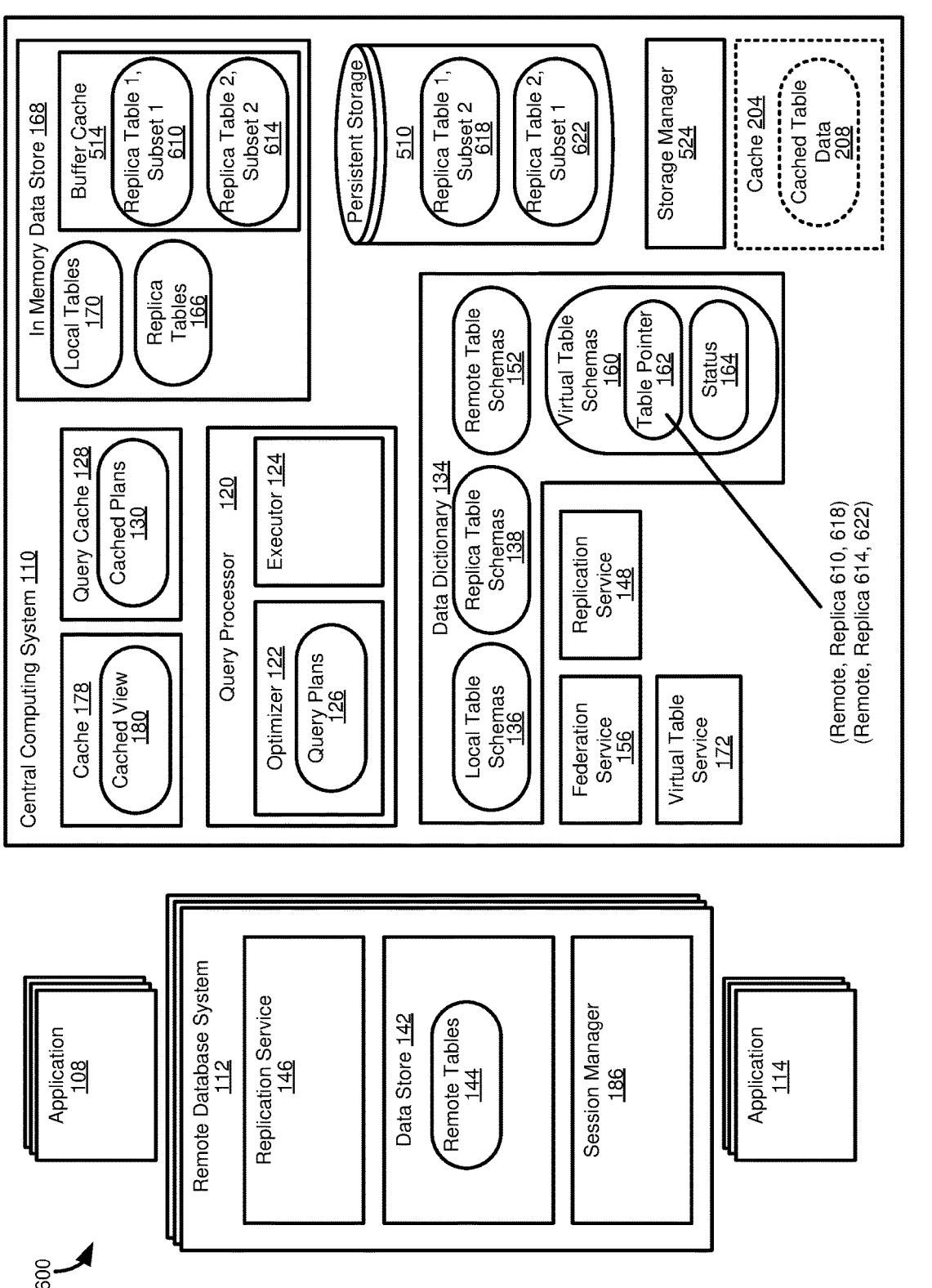
FIG. 6) is a diagram illustrating a computing architecture having virtual table schemas with logical pointers that can target remote tables, replica tables, or cached tables, and where replica tables can be stored in dynamic storage and can have subsets that are independently manageable in the dynamic storage.

Example 14—Example Architecture for Virtual Tables Having Configurable Replica Tables FIG. 6 illustrates an example architecture 600 that is generally analogous to the architecture 500 of FIG. 5. Components that are the same between the architecture 600 and the architectures 100, 200, 300, 400, 500 maintain numbering of FIGS. 1-5. Components of the architecture 600 corresponding to those in FIGS. 1-5 can have the functions as discussed in Examples 2-6, except as modified by any discussion in this Example 7. For convenient presentation, the data lake 410 is not shown in FIG. 6, but could be included if desired.

In some cases, data for a given virtual table schema 160 is stored either entirely in the buffer cache 514 as a table 518 or entirely in physical storage 510 as a table 520. However, in some embodiments, data for a given virtual table schema 160 can be stored in both the physical storage 510 and in the buffer cache 514. Subsets of data can be selected using criteria such as table partitions, particular columns, or particular column values (which, in some cases, can be specified by particular query conditions). Rather than transferring entire tables between the buffer cache 514 and the physical storage 510, the storage master 524 can transfer a relevant subset of data based on similar criteria as used for managing the location of entire tables. Allowing subsets of tables to be managed by the storage master 524 can provide more fine grain control over query performance, and can help maximize the value of having the buffer cache 514. Allowing subsets of tables to be managed by the storage master 524 can also allow the size of the buffer cache 514 to be reduced while maintaining a similar or higher level of performance as compared to when an entire table is the management unit for the storage master 524. Similar subsetting can be used in other embodiments that use replica tables as target tables for virtual tables, such as the embodiments described in Examples 2-6.

FIG. 6 illustrates this embodiment. The storage manager 524 manages replica tables 1 and 2, each having first and second subsets (which, again, can correspond to partitions, particular columns, particular filter criteria, etc., and where a given table can have two or more subsets). In addition, not all of the tables managed by the storage manager 524 need be associated with subsets. That is, the storage manager 524 can manage tables on an entire table basis when the table is defined as the management unit, or can manage tables on a subset basis when subsets are available and specified as the management unit.

The buffer cache 514 include a first subset 610 of the first replica table and a second subset 614 of the second replica table. The physical storage 510 includes a second subset 618 of the first replica table and a first subset 622 of the second replica table. If the first subset 622 of the second replica table meets particular criteria, such as being requested, or being requested a threshold number of times, it can be moved from the physical storage 510 to the buffer cache 514. If necessary to make room in the buffer cache 514, the first subset 610 of the first replica table or the second subset 614 of the second replica table can be removed from the buffer cache and stored in the physical storage 510. Note that multiple subsets of a given table may be included in either the buffer cache 514 or the physical storage 510, including having an entire table maintained in the buffer cache or in the physical storage. However, the entire table is still managed on the level of its subset, according to the embodiment of this Example 7.

Example 15)—Example Architecture for Virtual Tables Having Shared Replica Tables As discussed above, in some embodiments, a database associated with a central computing system can be associated with multiple database schemas, such as schemas for different tenants of the database system. In some implementations, multiple schemas may be associated with virtual tables (e.g., tables defined by a schema for a virtual table) that target the same remote table.

Figure 7:
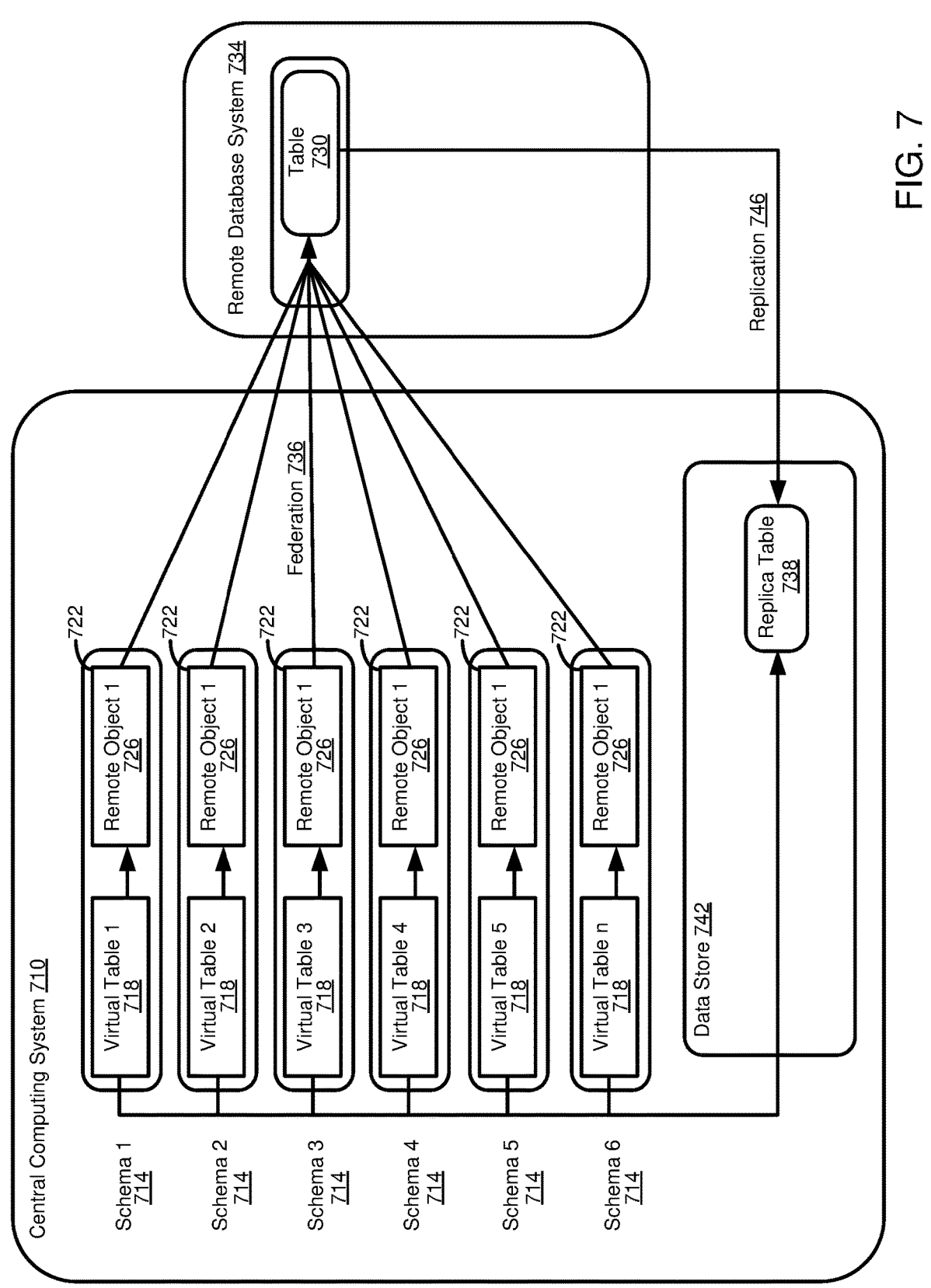
FIG. 7) is a diagram illustrating a scenario where multiple virtual table schemas can target a remote table or can share a replica table.

FIG. 7 illustrates this scenario, where a central computing system 710 is associated with a plurality of database schemas 714. Each schema 714 includes a schema 718 for a virtual table that includes a table pointer 722 that includes an identifier 726 for a first remote object. As shown, the first remote object is a table 730 located on a remote database system 734.

Since data for any of the virtual tables 718 will be retrieved from the remote database system 734, such as using a federation process 736, there is no performance disadvantage to having each of the schemas 714 include the identifier 726 for the remote table 730. However, if any of the schemas 714 is updated to reflect that the table pointer 722 should be updated to point to a replica table, it may be beneficial to make changes to the other database schemas 714.

Once a table pointer 722 for a virtual table schema 718 is updated to point to a replica table, an appropriate replica table 738 can be created in a data store 742 of the central computing system 710 using a replication process 746. The replication process 746 can be an ongoing replication process such that the replica table 738 is updated with changes made to the table 730.

When the replica table 738 has been created, the table pointer 722 of the schema 714 that requested the change to the table pointer can be updated to point to the replica table instead of the remote table 730. In some scenarios, the table pointers 722 for the remaining schemas 714 that include a virtual table schema that references the remote table 730 can be updated to also reference the replica table 738. Thus, query performance for all schemas 714 can be improved if a single schema requests that the replica table 738 be used. By having all the schemas 714 reference the same replica table 738, it is not necessary to create multiple replica tables 738 on the data store 742.

In some cases, a virtual table schema 718 can specify whether the replica table 738 should be shared. If the replica table 738 is designated as shareable, the scenario of FIG. 7 can result. If the replica table 738 is designated as non-shareable, the replica table is only available to the schema 714 which requested the change to a replica table. The remaining schemas 718 reference the remote table 730, until and unless they request to create another replica table in the data store 742 (in which case there can be multiple replica tables of the same remote table 730 in the data store) or the schema 714 that requested the creation of the replica table 738 changes the status of the replica table to shareable.

In the case of shared tables, conflicts can arise between commands issued on behalf of different schemas 714. For example, assume that a first schema 714 issues a first command to create a replica table 738 at a first location. If a second schema 714 issues a second command to create a virtual table schema 718 with a replica table 738 at the first location, the instructions in the second command to create the replica table can be ignored. If the second command is to create the replica table 738 at a second location, an exception can be raised. In some cases, the second request will be treated as a request to move the replica table 738 to the second location.

Similarly, an exception can be raised if the second command requests the replica table 738 to have a different partition specification or load unit (e.g., page loadable versus column loadable) than specified in the first command. The second request can be treated as a request to repartition the replica table 738 or to change the load unit of the replica table. However, if the load unit of the replica table 738 requested by the first command was column loadable, a command in the second request to create a page loadable replica table may be ignored. Similar actions can be taken if the second request is a request to add a replica table as a target table for a virtual table schema 718 that previously targeted the remote table 730.

Schemas 714 can be associated with requests to drop a replica table 738. If the replica table 738 is shared by multiple schemas 714, the replica table may not be dropped unless a shareable replica table is only referenced by the schema associated with the request to drop the table. That is, the replica table 738 may not be dropped if other table pointers 722 point to the replica table. A counter can be used to track how many schemas 714 are sharing a particular shareable replica table 738. However, if a request to drop a column loadable replica table 738 is received, the request can be used to alter the table to a page loadable replica table if no other schemas 714 sharing the replica table requested a column loadable replica table.

Requests to alter partitioning or location information for a replica table 738 can be handled, in some implementations, by processing the most recent request. For load unit, a request may be processed to change a replica table 738 from page loadable to column loadable. However, a request to change a replica table 738 from column loadable to page loadable may be ignored if other schemas 714 than the schema associated with the request have specified that a column loadable replica table is to be used.

Example 16)—Example Query Plan Recompilation on Update of Virtual Table Pointer As discussed above, an advantage of disclosed technologies is that they provide a schema for a virtual table where the table that holds data for the corresponding table schema can be dynamically updated without having to add or drop the table schema. In at least some cases, however, any previously compiled query plans can be updated to reflect that a different table is targeted by the virtual table schema. FIG. 8 illustrates a process 800 for query plan recompilation.

A first query plan 810 is compiled based on a first target table for a virtual table schema. At 814, a request is received to update the table targeted by the virtual table schema to a second target table. For instance, the first target table can be a remote table and the second target table can be a replica table. Or, the first target table can be a replica table and the second target table can be a remote table. However, other types of target tables, including cached target tables and replica target tables located in different storage locations (e.g., a data lake, persistent storage, a cache buffer) can also be included in the process 800.

The query plan is recompiled at 818 using the updated target table for the virtual table schema to produce a query plan 822 that references the updated target table.

Example 17)—Example Database Artifacts Supporting Virtual Tables

FIGS. 9A and 9B illustrate example database artifacts that can be used to implement the technologies of the present disclosure.

A database system can track query performance. Queries that satisfy particular criteria, such as having execution times that are sufficiently long to satisfy a threshold, or otherwise has resource use that satisfies a threshold, can be designated as expensive queries. Expensive queries can be tracked, such as by creating a record for the query in a table of expensive queries.

Table 900 of FIG. 9A lists properties for a column 902 that can be added to a table that tracks expensive queries (e.g., M_EXPENSIVE_STATEMENTS). The column 902, TABLE_TYPES, can list whether the query includes tables that are formatted for use in a row store, tables that are formatted for use in a column store, or tables that are associated with a virtual table schema (and thus can have variable types of target tables, such as remote tables, replica tables, or cached tables). In some cases, a query can include multiple types of tables, which case the column 902 can include multiple values. In other cases, if a query includes multiple table types, multiple entries for the query can be included in the table of expensive queries, where each entry includes a single value for the column 902.

In further cases, a table analogous to the table 900 is included, but does not specifically identify table types for the query. Instead, a value, such as a Boolean value, can indicate whether the query includes any virtual tables. In another implementation, a table analogous to the table 900 is included, but, for queries that include a virtual table, includes information specifying a target type for virtual tables in the query (e.g., remote table targets, replica table targets, cache table targets).

Table 906 of FIG. 9A lists properties for a column 908 that can be added to a table that lists properties for a virtual table (e.g., can be a column in a table that described a virtual table schema). The column 908, HAS_REPLICA, can be used to provide an indicator, such as a Boolean value, indicating whether the virtual table targets a replica table. For example, if the virtual table targets a remote table, the value can be FALSE. If the virtual table is updated to target a replica table, the value can be updated to TRUE.

Table 912 of FIG. 9A lists properties for various columns that can be included in a table, VIRTUAL_TABLE_REP-LICAS, that contains information about replica tables targeted by one or more virtual table schemas. A column 914 provides a schema name for a schema that includes the virtual table. The schema name can identify, for example, one of the schemas 714 of FIG. 7. A column 916 lists the name of the virtual table schema in the schema provided in the column 914. The schema name can, for example, identify a virtual table schema 718. Similarly, a column 918 and a column 920 can provides names for a database schema and replica table schema for the replica table referenced by the virtual table schema identified in the column 916. Note that in some cases, the replica tables may be associated with a schema other than a particular user database schema (e.g., the schema identified in column 914), such as a schema associated with a central computing system and used internally to manage virtual tables according to the present disclosure.

A column 922 can provide a type for the replica table. In some cases, the type can refer to a type of replication used for the replica table, such as whether asynchronous or synchronous replication is used to replicate data from the source table (e.g., a remote table) to the replica table. In other cases, the type can refer to how queries are processed while a replica table is being prepared. A designation of asynchronous can result in a remote table continuing to be used for queries while the replica table is being prepared. In other words, a DDL statement altering the table status can be effective before the query behavior actually changes. A designation of synchronous can result in queries being rejected or held until the replica is complete—in which case the DDL change and query behavior change are essentially concurrent. In further implementations, a designation of synchronous in column 922 can indicate that a federated table (or otherwise a table location currently reflected in the value of the table pointer, such as a location of the table in a virtual table cache) should be used for queries until an up to date replica table is available, and a designation of asynchronous indicates that the replica table should immediately be used for queries, even if it is not up to date as compared with its source table (e.g., the remote or federated table).

A column 924 can indicate whether a replica table is currently being used by a virtual table. That is, if the value for column 924 is FALSE, then a remote table may be specified as the target for the virtual table schema. If the value for the column 924 is TRUE, replication of the remote table is enabled, and the virtual table schema targets the replica table.

A column 926 can be used to indicate whether a replica table can be shared by multiple virtual tables (e.g., with different database schemas of multiple users), such as having a value of TRUE if the table is shareable and FALSE otherwise. A column 928 can be used to indicate how data for a replica table will be loaded, such as when the replica table is stored in a system with dynamic storage. Values for the column 928 can indicate whether the table is either maintained entirely in persistent storage or in a buffer cache, is loadable by pages, or is loadable by particular columns. If the replica table is also a shared table, various protocols can be used to determine the value of column 928. For example, if multiple users request a replica table, but using a different value of column 928, a protocol can select that the last requested value be used for column 928. That is, if a replica table already exists, a request to create a replica table with a different value for column 928 than a current value can result in a change to the value in column 928 for the existing replica table, rather than creating a new replica table.

Or, some values for column 928 can be given precedence. For example, if any virtual table schema requests that a replica table be column loadable, that value will override any request that the replica table be page loadable. However, if a schema associated with a request for a column loadable table elects to drop a replica table (e.g., to switch to a remote table), but other schemas are using the replica table, the request to drop the replica table can result in the replica table being changed from column loadable to page loadable, at least absent another explicit request having been received from another database schema that the replica table should be column loadable.

Referring to FIG. 9B, a table 960 can be used to track information for replica tables. The table 960 can be used to provide additional information for replica tables, such as for monitoring the status of replica tables. The table 960 can include a column 962 that includes host information and a column 964 that includes port information for a system where the replica table can be accessed (and can be used, for example, to indicate whether the replica table is located in memory, in a buffer cache, in persistent storage, in a data lake, etc.).

The table 960 includes columns 966, 968, 970, 972 for a schema name for the replica table, a table name for the replica table, a schema name for the virtual table, and a schema name for the virtual table, which can be implemented at least generally as described for the columns 918, 920, 914, 916 for the table 912 of FIG. 9A. A column 970 can specify a replica type, and can be implemented at least generally as described for the column 922 of table 912.

As discussed in Example 7, a replica table can be associated with subsets, such as partitions. A column 976 can be used to indicate a particular table partition associated with a record of the table 960, where a value of "0" can be used for nonpartitioned tables.

A column 980 can be used to indicate a status for the replica table, such as whether replication is disabled, enabled, or if a replica is currently being generated. In some cases, whether replication is disabled or enabled can be correlated with whether any virtual table schema targets the replica table. However, in some cases, tables can be replicated even if they are not currently targeted by a virtual table schema. If a replica is in the process of being generated, the progress of the replica generation process can be recorded in a column 978 (e.g., whether the replication process is 25% complete, 50% complete, 75% complete, 99% complete, etc.).

Replication can be enabled or disabled, including depending on whether a virtual table schema targets a replica table. Times associated with enabling or disabling replication can be recorded in columns 982, 984, respectively.

As described in Example 8, replica tables can be shared, in some implementations. When replica tables are shareable, a column 986 can be used to indicate a number of virtual table schemas that target a given replica table.

Example 18)—Example Query Language Operations Supporting Virtual Tables

FIG. 10 illustrates example query language statements, such as DDL statements, that can be used to implement various features described in the present disclosure, including as described in Examples 1-10. Statement 1008 is an example statement for creating a virtual table that targets a replica table created from a remote table. The statement 1008 includes arguments for the name of the virtual table, the location of the remote table (which can include the remote table name), optionally any properties to be specified for the remote table/location (e.g., a "remote properties clause" as used in the HANA database system of SAP SE of Walldorf, Germany, more generally such properties can include parameters to be used by a remote database system, or by an adapter that communicates with the remote database system, for fetching metadata for, or data from, a remote data object, such as a remote database table), an indicator of whether the replica table will be shared, optionally information partitioning the replica table, optionally any load unit parameters for the replica table (e.g., whether the replica table will be page loadable or column loadable), and a location for the replica table (e.g., at a location associated with in-memory tables, in data lake, at a location managed by a dynamic storage manager).

Statement 1012 is an example command to create a replica table for a remote table being targeted by a virtual table schema. The statement 1012 includes arguments for the name of the virtual table, whether the table will be shared, optionally information regarding partition information or load unit information, as described for the statement 1008, and a location for the replica table.

Statement 1016 is an example command to drop a replica table. The statement 1016 takes as arguments the name of the virtual table schema and an identifier of whether all replicas should be dropped or only replicas at one or more specified locations. That is, for example, virtual table schemas can be used in a scale-out scenario where multiple replica tables are available, or in a scenario with only a single replica. Thus, requests to alter or drop replica tables can include information sufficient to identify selected tables to which the request should be send/applied or whether the request should apply to all replica tables. Similarly, DML or similar statements can be used to create additional replica tables, either to create a scale-out system or to add one or more additional replicas to a scale out system.

If a virtual table schema is associated with a remote table and a replica table, statements 1020, 1022 can used to switch between targeting the replica table and targeting the remote table, respectively. The statements 1020, 1022 take as arguments the name of the virtual table schema, and an identifier as to whether all, or one or more specified, replicas should be targeted or not targeted (e.g., as described above, in a scale out system, requests can selectively disable/enable one or more specified replica tables or can target all replica tables).

Statement 1026 can be used to change the location of a replica table, such as between primary database storage (e.g., in-memory storage) and persistent storage, dynamic storage, or external storage, such as storage in a data lake. The statement 1026 takes as arguments the name of the virtual table schema, the current location of the replica table, and the location to which the replica table should be moved.

Properties, such as partition information or a load unit type, can be changed for a replica table using the statement 1030. Arguments for the statement 1030 include the name of the virtual table schema, the replica table location (e.g., in the case of a scale out system, the location of one or more particular replica tables or an indication that the statement should apply to all replica tables), and an indicator of the property being changed, such as partition information or load unit information.

Query language statements can be used to create, or modify, tables to select other aspects of the disclosed technologies for use (or non-use). For example, a DDL statement to create a table can include an option to enable caching (e.g., in the virtual table cache 204 of FIG. 2). DDL statements can be used to alter cache behavior for existing tables, such as to enable or disable caching. Similarly, cache behavior can be altered, such as specifying whether data should be prospectively placed in the cache or fetched and cached upon a request for data. Cache options, including cache size or priorities for particular tables (e.g., being useable to determine which tables should be removed from the cache when full), can also be specified by DDL statements or similar commands.

Example 19)—Example Operations in Creating Replica Table Target

Figure 11:
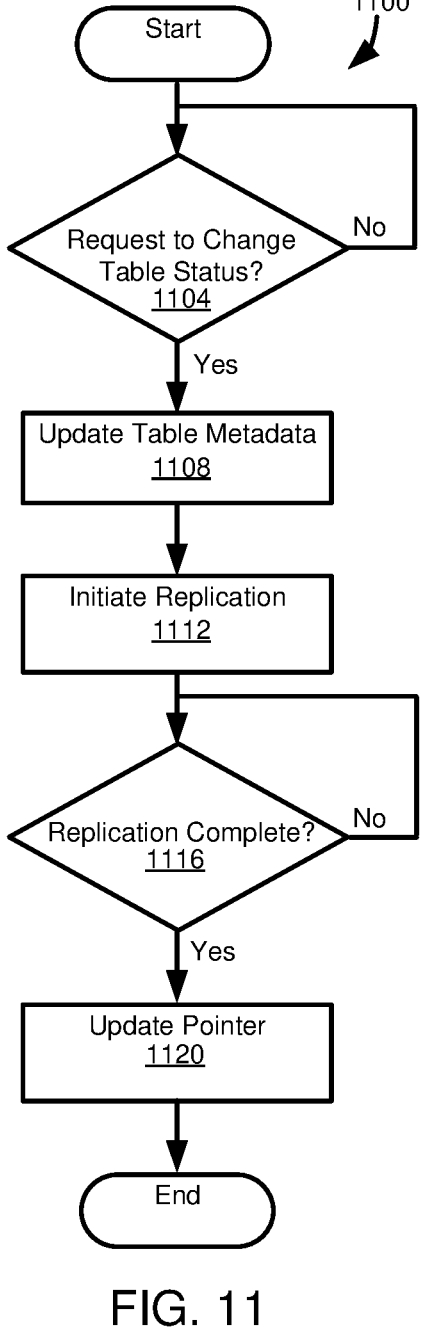
FIG. 11 is a flowchart illustrating operations in a method for updating a logical pointer of a virtual table schema to target a replica table.

FIG. 11 is a flowchart illustrating operations in a method 1100 for creating a replica table as a target for a virtual table schema. At 1104, it is determined whether a request has been received to change the target for the virtual table schema. The request can be a request from a user, or can be a request generated upon detecting that particular conditions are met, such as a remote table being requested at a sufficient frequency. If a request was not received, the method 1100 loops at 1104. If a request to change the table target has been received, the method 1110 proceeds to 1108.

At 1108, table metadata for the virtual table schema is updated to reflect that the virtual table schema targets a replica table rather than the remote table. At 1112, replication of the remote table is initiated. In the method 1100, until the replica table is available, queries against the virtual table schema continue to use the remote table. Decision 1116 determines whether the replication process is complete, and the replica table is available for use. Until the replica table is ready, the method 1100 loops at 1116. Once the replica table is available, the method 1100 proceeds to 1120, where the table pointer for the virtual table schema is updated to target the replica table. That is, even though some table metadata is updated at 1108 to indicate that the virtual table targets a replica table instead of a remote table, the actual table pointer is not changed until the replica table is ready for use. In some implementations, a request to update the target of the virtual table schema to a remote table from a replica table can be processed while the replica table is still being generated in response to a prior request to target a replica table. In such cases, the replica table generation process can be aborted.

In cases where a replica was created and not deleted in response to a prior request to retarget the remote table, the method 1100 can concurrently update the virtual table metadata to indicate that the replica table is the target and to update the table pointer to the replica table. Or, if replication was disabled, but the replica table was not removed, the virtual table metadata can be updated to reflect that a replica table is targeted, and the table pointer can be updated to the replica table once the replica is up to date.

Example 20)—Example Operations in Deleting Replica Table Target

Figure 12:
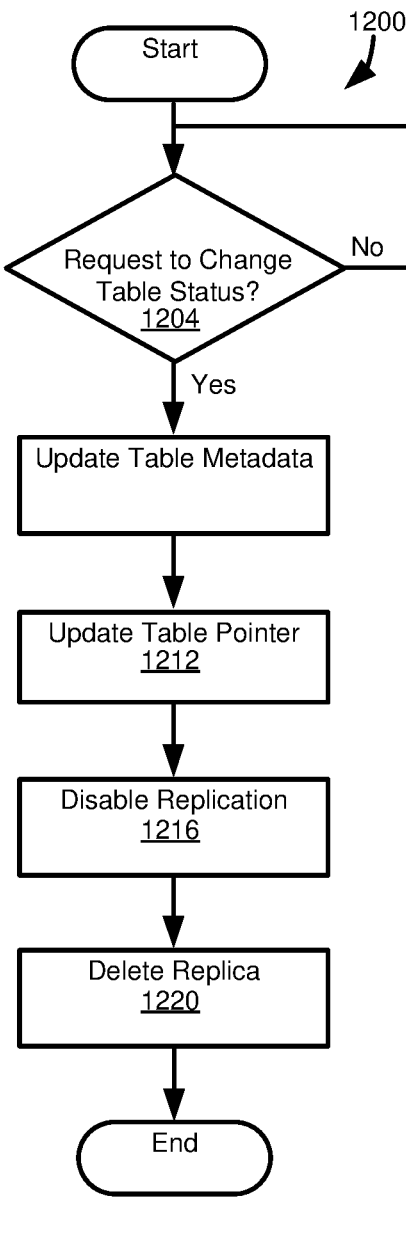
FIG. 12 is a flowchart illustrating operations in a method for updating a logical pointer of a virtual table schema from targeting a replica table.

FIG. 12 is a flowchart illustrating operations in a method 1200 for changing the table targeted by a virtual table schema from a replica table to a remote table. At 1204, it is determined whether a request has been received to change the target for the virtual table schema. The request can be a request from a user, or can be a request generated upon detecting that particular conditions are met, such as a remote table not being requested at a sufficient frequency. If a request was not received, the method 1200 loops at 1204. If a request to change the table target has been received, the method 1200 proceeds to 1208.

At 1208, metadata for the virtual table schema is updated to reflect that the virtual table targets a remote table. The table pointer is updated at 1212 to target the remote table. Replication for the replica table is disabled at 1216, and the replica table is deleted at 1220.

In some implementations, the replica is not deleted at 1220, or at least is not immediately deleted, which can be beneficial if a user decides to retarget the replica table. Similarly, replication is not disabled at 1216, at least not immediately, in some scenarios.

Figure 13:
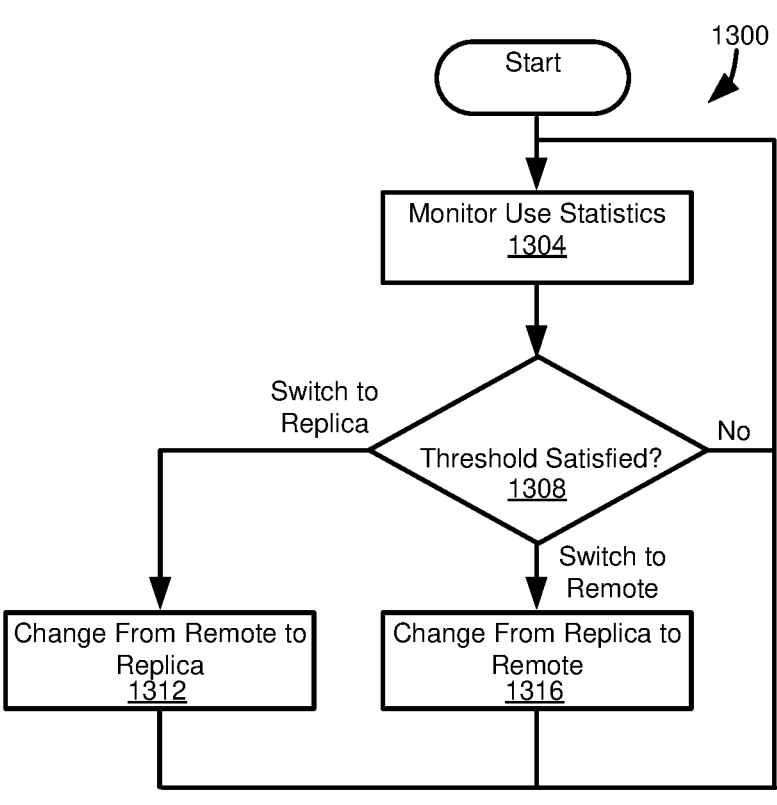
FIG. 13 is a flowchart illustrating operations in a method for determining when to update a logical pointer of a virtual table schema between targeting a remote table and targeting a replica table.

Example 21)—Example Operations in Changing Virtual Table Target Between Remote and Replica FIG. 13 is a flowchart illustrating operations in a method 1300 for determining whether a virtual table should target a remote table or a replica table. At 1304, use statistics for the virtual table are measured. Use statistics can include determining how often the virtual table is accessed, how much data is retrieved from the virtual table, how long queries using the virtual tables take to execute, a number of users having queries that use the virtual table, other factors, or a combination of these factors. In particular, performance of queries that access remote tables can be tracked (e.g., in a table that lists queries that access remote tables and provides performance details, such as execution times). It may be expected that such queries will take longer to execute, and may need to be more closely monitored, given that they retrieve data from federated database systems. In addition, queries that satisfy performance parameters, such as exceeding a threshold execution time, can be tracked, such as including the queries in a table of "expensive" queries that lists the query and performance parameters, such as execution times. Expensive queries can also be located, in some implementations, by querying a query plan cache that includes performance statistics for cached query plans.

It is determined at 1308 whether the use statistics satisfy threshold criteria for changing a table targeted by a virtual table schema. If statistics do not satisfy the criteria, the method can return to 1304. If the use statistics indicate that the virtual table should target a replica table instead of a remote table, such as the virtual table exceeding a use frequency, the method 1300 can proceed to 1312. At 1312, the table pointer for the virtual table is changed from a remote table to a replica table. 1312 can use the process 1100 of FIG. 11.

If the use statistics indicate that the virtual table should target a remote table instead of a replica table, such as use statistics being less than a threshold amount, the method 1300 can proceed to 1316. At 1316, the table pointer for the virtual table schema can be updated to target the remote table instead of the replica table, and can use the process 1200 of FIG. 12. After 1312 or 1316, the method 1300 can return to 1304.

Example 22)—Example Operations in Managing Virtual Table Cache

Figure 14:
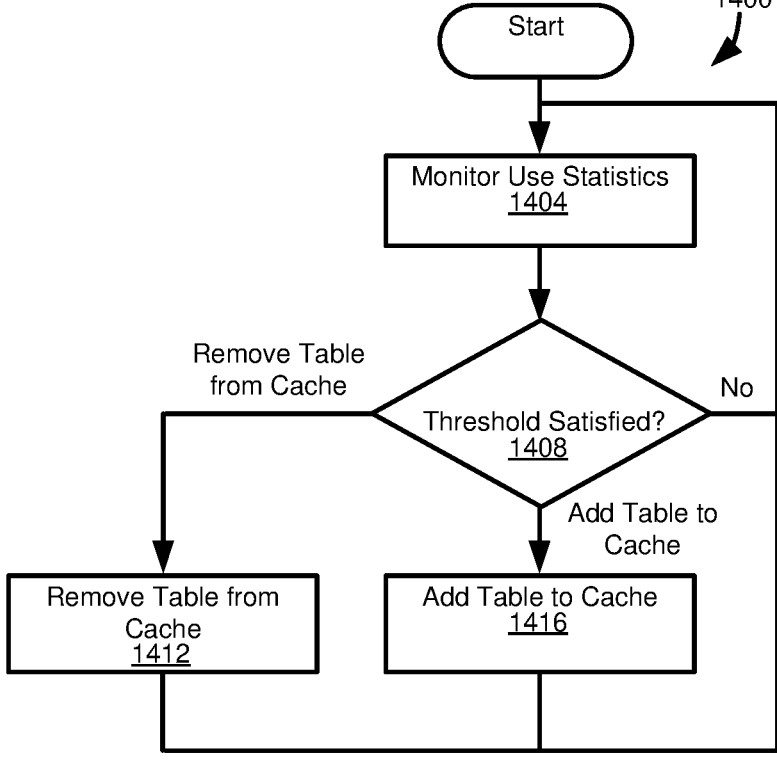
FIG. 14 is a flowchart illustrating operations in a method for determining whether remote table data should be stored in a cache.

FIG. 14 is a flowchart illustrating operations in a method 1400 of determining whether a remote table should be added to a cache or removed from a cache. At 1404, use statistics for the virtual table are monitored. Use statistics can include determining how often the virtual table is accessed, how much data is retrieved from the virtual table, how long queries using the virtual tables take to execute, a number of users having queries that use the virtual table, other factors, or a combination of these factors. In particular, performance of queries that access remote tables can be tracked (e.g., in a table that lists queries that access remote tables and provides performance details, such as execution times). It may be expected that such queries will take longer to execute, and may need to be more closely monitored, given that they retrieve data from federated database systems. In addition, queries that satisfy performance parameters, such as exceeding a threshold execution time, can be tracked, such as including the queries in a table of "expensive" queries that lists the query and performance parameters, such as execution times. Expensive queries can also be located, in some implementations, by querying a query plan cache that includes performance statistics for cached query plans.

It is determined at 1408 whether the use statistics satisfy threshold criteria for changing a table targeted by a virtual table schema. If statistics do not satisfy the criteria, the method can return to 1404. If the use statistics indicate that data from a remote table targeted by the virtual table schema and stored in the cache should be removed from the cache, the table data can be removed from the cache at 1412. Use statistics that indicate that remote table data should be removed from the cache can include determining that the data stored in the cache was not used within a threshold frequency (such as determined using an LRU algorithm).

If, at 1408, the use statistics indicate that data for a remote table is not present in the cache, and should be stored in the cache, the data can be stored in the cache at 1416. Use statistics that indicate that remote table data should be added to the cache can include determining that the data stored in the cache was used within a threshold frequency (such as determined using an LRU algorithm). In some cases, data is always added to the cache when it is requested and is not present in the cache. In other cases, the determining at 1408 requires that data be requested a threshold number of times before proceeding to 1416. After 1412, 1416, the method 1400 returns to 1404.

Figure 15:
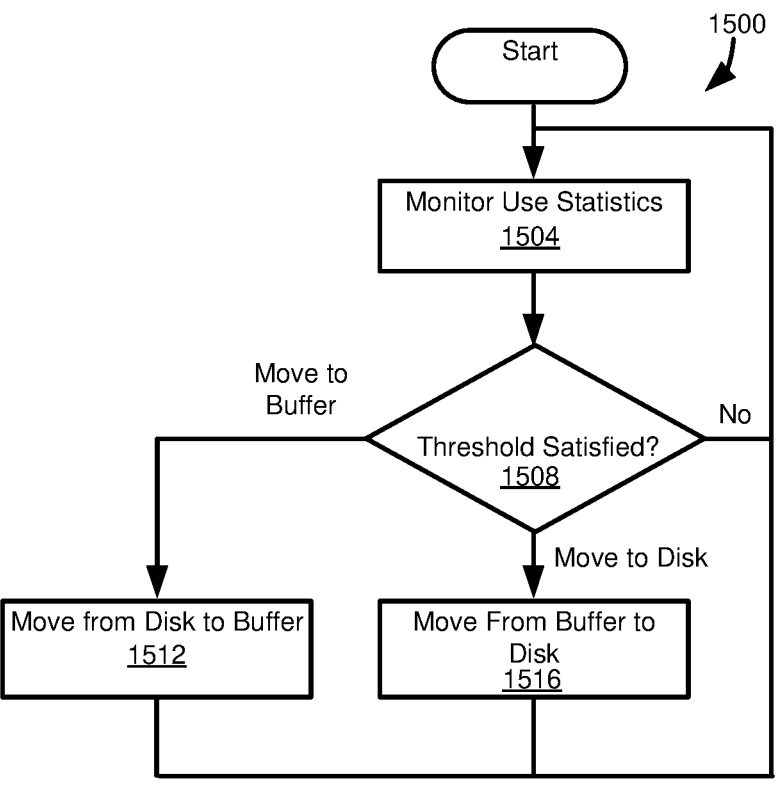
FIG. 15 is a flowchart illustrating operations in a method for managing replica table data in dynamic storage.

Example 23)—Example Operations in Changing
Virtual Table Replica Between In-Memory Buffer
and Disk Storage FIG. 15 is a flowchart illustrating operations in a method 1500 for managing dynamic storage, such as determining whether data for a replica table targeted by a virtual table schema should be stored in a buffer cache or in persistent storage, such as on disk. At 1504, use statistics for the virtual table are measured. Use statistics can include determining how often the virtual table is accessed, how much data is retrieved from the virtual table, how long queries using the virtual tables take to execute, a number of users having queries that use the virtual table, other factors, or a combination of these factors. In particular, queries that satisfy performance parameters, such as exceeding a threshold execution time, can be tracked, such as including the queries in a table of "expensive" queries that lists the query and performance parameters, such as execution times. Expensive queries can also be located, in some implementations, by querying a query plan cache that includes performance statistics for cached query plans.

It is determined at 1508 whether the use statistics satisfy threshold criteria for changing a location of replica table data. If statistics do not satisfy the criteria, the method can return to 1504. If the use statistics indicate that the replica table data should be moved from disk to the cache buffer, such as the replica table data exceeding a use frequency, the method 1500 can proceed to 1512. At 1512, the replica table data is moved from disk to the cache buffer.

If the use statistics indicate that replica table data stored in the cache buffer should be moved to disk, such as use statistics being less than a threshold amount, the method 1500 can proceed to 1516. At 1516, the replica table data can be moved from the cache buffer to disk. After 1512 or 1516, the method 1500 can return to 1504.

Figure 16:
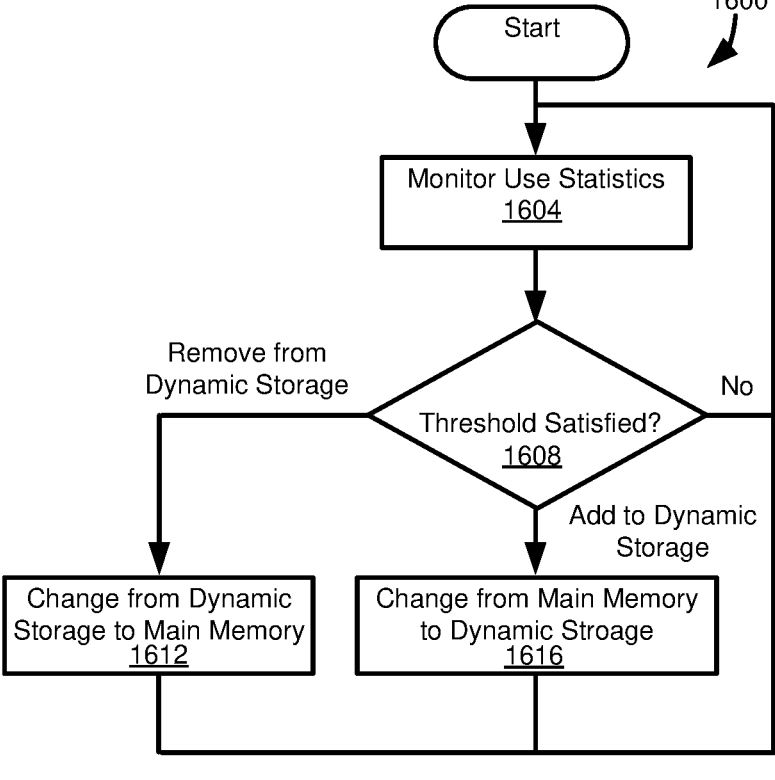
FIG. 16 is a flowchart illustrating operations in a method for managing whether replica table data is stored in main or dynamic storage.

Example 24)—Example Operations in Changing
Virtual Table Replica Between Primary Storage and
Dynamic Storage FIG. 16 is a flowchart illustrating operations in a method 1600 for managing whether a table is maintained in primary storage, such as main memory, or is maintained in a dynamic storage system, such as a dynamic storage system managed using the method 1500 of FIG. 15. At 1604, use statistics for the virtual table are measured. Use statistics can include determining how often the replica table data is accessed, how much data is retrieved from the replica table, how long queries using the replica tables take to execute, a number of users having queries that use the replica table, other factors, or a combination of these factors. In particular, queries that satisfy performance parameters, such as exceeding a threshold execution time, can be tracked, such as including the queries in a table of "expensive" queries that lists the query and performance parameters, such as execution times. Expensive queries can also be located, in some implementations, by querying a query plan cache that includes performance statistics for cached query plans.

It is determined at 1608 whether the use statistics satisfy threshold criteria for changing a location of replica table data. If statistics do not satisfy the criteria, the method can return to 1604. If the use statistics indicate that the replica table data should be moved from dynamic storage to main memory, such as the replica table data exceeding a use frequency, the method 1600 can proceed to 1612. At 1612, the replica table data is moved from dynamic storage to main memory.

If the use statistics indicate that replica table data stored in main memory should be moved to dynamic storage, such as use statistics being less than a threshold amount, the method 1600 can proceed to 1616. At 1616, the replica table data can be moved from main memory to dynamic storage (which can be one or both of a cache buffer or persistent storage). After 1612 or 1616, the method 1600 can return to 1604.

Example 25)—Example Operations in Update of
Logical Pointers for Virtual Table Schemas FIG. 17 is a flowchart illustrating operations 1700 for updating a logical pointer for a virtual table schema. The operations 1700 can be carried out, for example, using the architecture 500 of FIG. 5 or the architecture 600 of FIG. 6, and the technologies described in any of Examples 1-17.

At 1710, a first schema for a first virtual table is created in a data dictionary. The first schema includes a first logical pointer having a first value specifying a location of a first table having first data and defined according to the first schema. The first location is in in-memory storage of a central computing system hosting a database management system. The database management system includes dynamic storage. The first location is not in the dynamic storage. The dynamic storage includes an in-memory buffer cache and persistent storage, and data stored in the dynamic storage can be transferred between the in-memory buffer cache and the persistent storage.

A request to update the first logical pointer to a second value is received at 1720. The second value specifies a second table at a second location. The second table is defined according to the first schema, and the second location is in the dynamic storage. The second value is assigned to the first logical pointer at 1730.

FIG. 18 is a flowchart illustrating operations 1800 for updating a logical pointer for a virtual table schema. The operations 1800 can be carried out, for example, using the architecture 500 of FIG. 5 or the architecture 600 of FIG. 6, and the technologies described in any of Examples 1-17.

At 1810, a first table definition is created in a data dictionary. The first table definition includes a first data element variably specifying a location of a table having data and defined according to the first table definition. A first value is assigned to the first data element at 1820. The first value identifies a first table at a first location. The first table is defined according to the first table definition, and is located in in-memory storage of a central computing system hosting a database management system that includes dynamic storage. The first location is not in the dynamic storage. Data stored in the dynamic storage can be transferred between an in-memory buffer cache and persistent storage.

At 1830, at least a portion of data stored in the first table is received. A second table is created in the dynamic storage at 1840. The second table is defined according to the first table definition. At 1850, the received at least a portion of data is stored in the second table. A second value is assigned to the first data element at 1860. The second value identifies a location of the second table in the dynamic storage.

FIG. 19 is a flowchart illustrating operations 1900 for updating a logical pointer for a virtual table schema. The operations 1900 can be carried out, for example, using the architecture 500 of FIG. 5 or the architecture 600 of FIG. 6, and the technologies described in any of Examples 1-17.

At 1910, a first schema for a first virtual table is created in a data dictionary. The first schema includes a first logical pointer specifying a first location of a first table having first data and defined according to the first schema. The first location is located in in-memory storage of a central computing system hosting a database management system. The database management system includes dynamic storage. The first location is not in the dynamic storage. Data stored in the dynamic storage can be transferred between an in-memory cache and persistent storage.

At least a portion of the first data is received at 1920. At 1930, a second table is created in the dynamic storage at a second location. The second table is defined according to the first schema. The received at least a portion of the first data is stored in the second table at 1940. At 1950, a second value is assigned to the first logical pointer. The second value specifies the second location.

Example 19—Computing Systems

Figure 20:
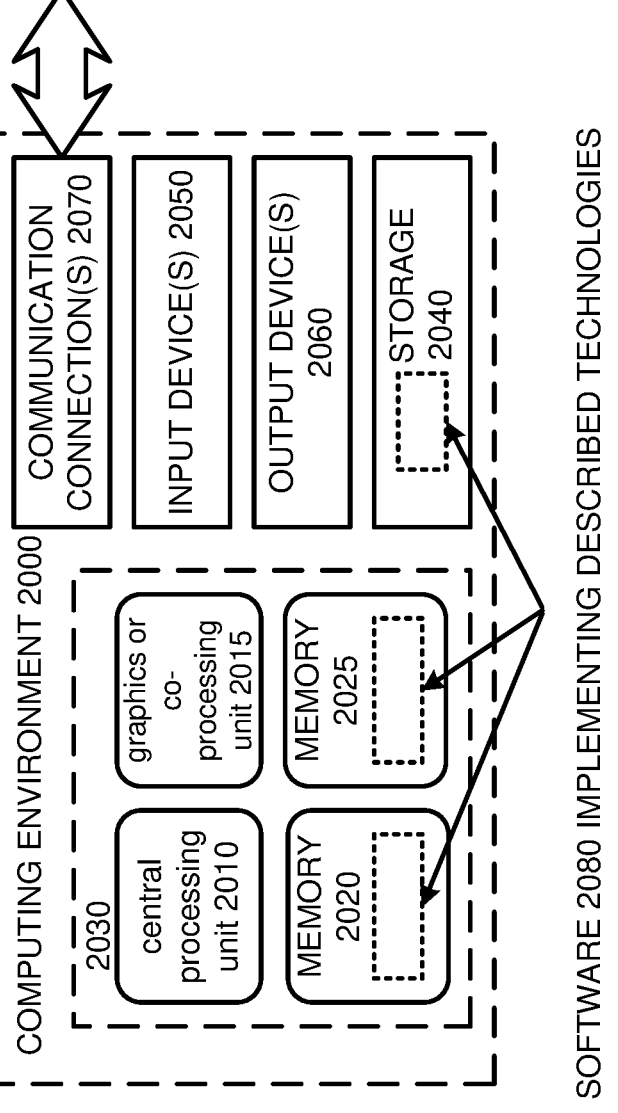
FIG. 20 is a diagram of an example computing system in which some described embodiments can be implemented.

FIG. 20 depicts a generalized example of a suitable computing system 2000 in which the described innovations may be implemented. The computing system 2000 is not intended to suggest any limitation as to scope of use or functionality of the present disclosure, as the innovations may be implemented in diverse general-purpose or special-purpose computing systems.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions, such as for implementing the features described in Examples 1-18. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s) 2010, 2015. The memory 2020, 2025 stores software 2080 implementing one or more innovations described herein, in the form of computer-executable instructions suitable for execution by the processing unit(s) 2010, 2015.

A computing system 2000 may have additional features. For example, the computing system 2000 includes storage 2040, one or more input devices 2050, one or more output devices 2060, and one or more communication connections 2070, including input devices, output devices, and communication connections for interacting with a user. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way, and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 20—Cloud Computing Environment

Figure 21:
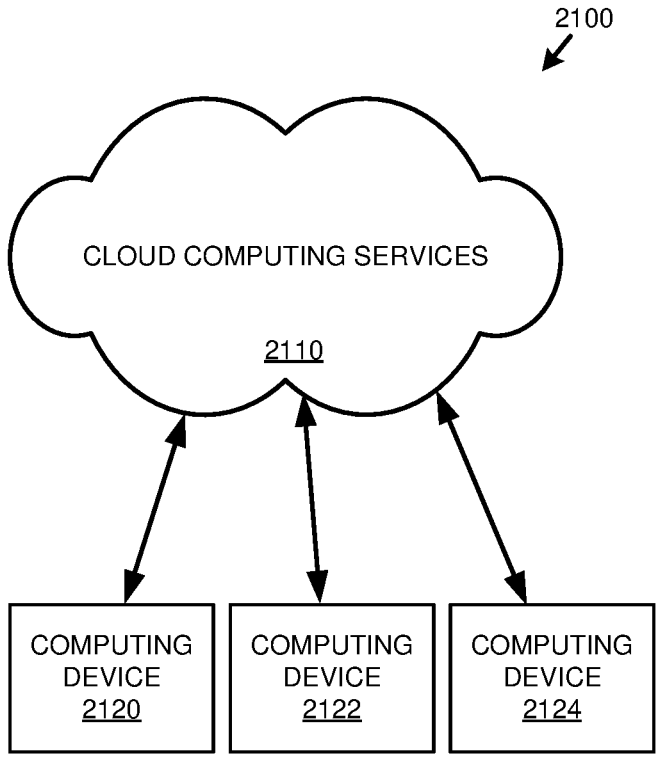
FIG. 21 is an example cloud computing environment that can be used in conjunction with the technologies described herein.

FIG. 21 depicts an example cloud computing environment 2100 in which the described technologies can be implemented. The cloud computing environment 2100 comprises cloud computing services 2110. The cloud computing services 2110 can comprise various types of cloud computing resources, such as computer servers, data storage repositories, networking resources, etc. The cloud computing services 2110 can be centrally located (e.g., provided by a data center of a business or organization) or distributed (e.g., provided by various computing resources located at different locations, such as different data centers and/or located in different cities or countries).

The cloud computing services 2110 are utilized by various types of computing devices (e.g., client computing devices), such as computing devices 2120, 2122, and 2124. For example, the computing devices (e.g., 2120, 2122, and 2124) can be computers (e.g., desktop or laptop computers), mobile devices (e.g., tablet computers or smart phones), or other types of computing devices. For example, the computing devices (e.g., 2120, 2122, and 2124) can utilize the cloud computing services 2110 to perform computing operations (e.g., data processing, data storage, and the like).

Example 21—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 20, computer-readable storage media include memory 2020 and 2025, and storage 2040. The term computer-readable storage media does not include signals and carrier waves. In addition, the term computer-readable storage media does not include communication connections (e.g., 2070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

at least one hardware processing unit coupled to the at least one memory; and one or more computer readable storage media storing computer-executable instructions that, when executed, cause the computing system to perform operations comprising:

creating a first schema, the first schema defining a structure for organizing queryable data having a first value specifying a first location of a first source of data, wherein the first schema is for a database object, the database object being a database view, a database table, or another database object configured to store or organize the queryable data, and wherein the first schema defines at least one attribute, wherein the at least one attribute is associated with specified data of the queryable data;

receiving a request to update the first schema to remove the first value and to add a second value specifying a second location of a second source of data;

in response to the receiving a request:

removing the first value from the first schema; and adding the second value to the first schema, the computing system providing access to data such that queries received subsequent to adding the second value are executed using the second source of data and queries received prior to removing the first value are executed using the first source of data and wherein an updatable value facilitates switching between data sources for query execution.

2. The computing system of claim 1, wherein the first location is a remote source of data.

3. The computing system of claim 1, wherein the first value and the second value are values of a logical pointer of the first schema.

4. The computing system of claim 1, the operations further comprising:

in response to the receiving a request, recompiling a query plan that comprises a reference to the database object to update the first value to the second value.

5. The computing system of claim 1, wherein the computing system implements a relational database and the first source of data or the second source of data stores semi-structured, unstructured, or binary data.

6. The computing system of claim 5, wherein the request comprises an ALTER command.

7. The computing system of claim 1, the operations further comprising:

sending a query from the computing system to a remote system comprising the second source of data.

8. The computing system of claim 7, the operations further comprising:

receiving a data definition language statement creating the first schema.

9. The computing system of claim 8, wherein the remote system comprises a data lake as the first source of data or the second source of data.

10. The computing system of claim 1, wherein the database object is a database table.

11. The computing system of claim 1, wherein a query comprising an identifier of the first schema is not changed when the first value is updated to the second value.

12. The computing system of claim 1, wherein the computing system implements a relational database and the first source of data or the second source of data stores semi-structured, unstructured, or binary data.

13. A method, implemented in a computing system comprising at least one memory and at least one hardware processing unit coupled to the at least one memory, the method comprising:

creating a first schema, the first schema defining a structure for organizing queryable data having a first value specifying a first location of a first source of data, wherein the first schema is for a database object, the database object being a database view, a database table, or another database object configured to store or organize the queryable data, and wherein the first schema defines at least one attribute, wherein the at least one attribute is associated with specified data of the queryable data;

receiving a request to update the first schema to remove the first value and to add a second value specifying a second location of a second source of data;

in response to the receiving a request:

removing the first value from the first schema; and adding the second value to the first schema, the method providing access to data such that queries received subsequent to adding the second value are executed using the second source of data and queries received prior to removing the first value are executed using the first source of data and wherein an updatable value facilitates switching between data sources for query execution.

14. The method of claim 13, further comprising:

sending a query from the computing system to a remote system comprising the second source of data.

15. The method of claim 14, further comprising:

receiving a data definition language statement creating the first schema.

16. The method of claim 15, wherein the remote system comprises a data lake as the first source of data or the second source of data.

17. One or more non-transitory computer readable storage media comprising:

computer-executable instructions that, when executed by a computing system comprising at least one hardware processor and at least one memory coupled to the at least one hardware processor, cause the computing system to create a first schema, the first schema defining a structure for organizing queryable data having a first value specifying a first location of a first source of data, wherein the first schema is for a database object, the database object being a database view, a database table, or another database object configured to store or organize the queryable data, and wherein the first schema defines at least one attribute, wherein the at least one attribute is associated with specified data of the queryable data;

computer-executable instructions that, when executed by the computing system, cause the computing system to receive a request to update the first schema to remove the first value and to add a second value specifying a second location of a second source of data;

computer-executable instructions that, when executed by the computing system, cause the computing system to in response to the receiving a request (1) remove the first value from the first schema; and (2) add the second value to the first schema, execution of the computer-executable instructions providing access to data such that queries received subsequent to adding the second value are executed using the second source of data and queries received prior to removing the first value are executed using the first source of data and wherein an updatable value facilitates switching between data sources for query execution.

18. The one or more non-transitory computer readable storage media of claim 17, further comprising:

computer-executable instructions that, when executed by the computing system, cause the computing system to send a query from the computing system to a remote system comprising the second source of data.

19. The one or more non-transitory computer readable storage media of claim 18, further comprising:

computer-executable instructions that, when executed by the computing system, cause the computing system to receive a data definition language statement creating the first schema.

20. The one or more non-transitory computer readable storage media of claim 19, wherein the remote system comprises a data lake as the first source of data or the second source of data.

*    *    *    *    *